US012478876B2

(12) United States Patent
Kato et al.

(10) Patent No.: US 12,478,876 B2
(45) Date of Patent: Nov. 25, 2025

(54) STORAGE MEDIUM, INFORMATION PROCESSING SYSTEM, INFORMATION PROCESSING APPARATUS, AND GAME PROCESSING METHOD

(71) Applicant: NINTENDO CO., LTD., Kyoto (JP)

(72) Inventors: Ken Kato, Kyoto (JP); Koji Takahashi, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 652 days.

(21) Appl. No.: 17/880,963

(22) Filed: Aug. 4, 2022

(65) Prior Publication Data

US 2023/0086477 A1 Mar. 23, 2023

(30) Foreign Application Priority Data

Sep. 22, 2021 (JP) ................................ 2021-154374

(51) Int. Cl.
*A63F 13/5258* (2014.01)
*A63F 13/5252* (2014.01)
*A63F 13/63* (2014.01)

(52) U.S. Cl.
CPC ...... *A63F 13/5258* (2014.09); *A63F 13/5252* (2014.09); *A63F 13/63* (2014.09)

(58) Field of Classification Search
CPC ................ A63F 13/525; A63F 13/5252; A63F 13/5258; A63F 2300/6661; A63F 2300/6669; A63F 2300/6684
See application file for complete search history.

(56) References Cited

U.S. PATENT DOCUMENTS 5,566,280 A * 10/1996 Fukui ...................... G06T 15/10 348/229.1
5,900,879 A * 5/1999 Berry ................. G06F 3/04815 345/419

(Continued)

FOREIGN PATENT DOCUMENTS

JE H11-007543 1/1999
JP H117543 A * 6/1997

(Continued)

OTHER PUBLICATIONS

"Animal Crossing: Happy Home Designer Playthrough Part 9," published Nov. 27, 2015. Source: youtube.com/watch?v=QF6Tia4FkGs (Year: 2015).*

(Continued)

*Primary Examiner* — Steven J Hylinski
(74) *Attorney, Agent, or Firm* — Nixon & Vanderhye P.C.

(57) ABSTRACT

An example of an information processing apparatus performs, in a predetermined area in a virtual space, editing including at least one of selecting a placement object to be placed in the area, placing the placement object, and moving the placement object, based on an operation input. The information processing apparatus performs presentation upon completion, which includes at least one scene and displays, for each scene, an image of the area based on a virtual camera. In the scene, the information processing apparatus sets a gaze point of the virtual camera at any of a position of the placement object placed in the area, a predetermined position in the area, and a position of a character arranged in the area, and sets the virtual camera at a position at which the placement object placed in the area is not placed.

34 Claims, 19 Drawing Sheets

(56) References Cited

U.S. PATENT DOCUMENTS

| | | | | |
|---|---|---|---|---|
| 6,078,329 A * | 6/2000 | Umeki | G06T 15/20 | 345/419 |
| 6,104,402 A * | 8/2000 | Goddard | G06T 15/005 | 345/422 |
| 6,139,434 A * | 10/2000 | Miyamoto | G06T 15/10 | 463/32 |
| 6,226,001 B1 * | 5/2001 | Bardon | G06T 17/00 | 345/419 |
| 6,323,895 B1 | 11/2001 | Sata | | |
| 6,612,930 B2 * | 9/2003 | Kawagoe | A63F 13/5258 | 463/33 |
| 7,386,799 B1 * | 6/2008 | Clanton | A63F 13/12 | 715/861 |
| 2005/0187015 A1 * | 8/2005 | Suzuki | A63F 13/26 | 463/32 |
| 2010/0279770 A1 * | 11/2010 | Ikeda | A63F 13/211 | 463/32 |
| 2021/0154578 A1 * | 5/2021 | Kuriyama | A63F 13/5252 | |

FOREIGN PATENT DOCUMENTS

| | | | |
|---|---|---|---|
| JP | 2006-268818 | 10/2006 | |
| JP | 3985369 B2 * | 10/2007 | A63F 13/10 |
| JP | 2009082188 A * | 4/2009 | A63F 13/10 |

OTHER PUBLICATIONS

"Animal Crossing: New Horizons", Nintendo Co., Ltd., searched on Sep. 1, 2021, https://www.animal-crossing.com/new-horizons/create, 11 pages.

Notice of Reasons for Refusal issued on Feb. 13, 2023 for Japanese Patent Application No. 2021-154374 and its machine translation in English, 10 pages.

[Live] Animal Crossing Unhappy Home Designer Day 9, Youtube [Online] [Video], Sep 01, 2015, 12 pages. https://www.youtube.com/watch?v=n-MMpZInjeo, [Search date Feb. 6, 2023].

[Seto's Live] Animal Crossing: Happy Home Designer Day 4 "I want to be wrapped in blue", Youtube [online], Aug. 2, 2015, nine pages [searched on Apr. 21, 2025], Internet: < URL: https://www.youtube.com/watch?v=plDJQ8kuwbM >.

[Seto's Live] Animal Crossing: Happy Home Designer Day 6 "Building a school with Ms. Shizue", Youtube [online], Aug. 6, 2015, [searched on Apr. 21, 2025] Internet: < URL:https://www.youtube.com/watch?v=4LyH7IVqtp0 >.

[Seto's Live] Animal Crossing: Happy Home Designer Day 7 "A house with a garden where children can play", Youtube [online], Aug. 14, 2015, four pages, [searched on Apr. 21, 2025] Internet: < URL:https://www.youtube.com/watch?v=Nq-enuGMiZg >.

Notice of Reasons for Refusal, issued on May 22, 2025 for Japanese Patent Application No. 2023-143861 and its machine translation in English, 10 pages.

* cited by examiner

STORAGE MEDIUM, INFORMATION PROCESSING SYSTEM, INFORMATION PROCESSING APPARATUS, AND GAME PROCESSING METHOD

CROSS REFERENCE TO RELATED APPLICATION

This application claims priority to Japanese Patent Application No. 2021-154374, filed on Sep. 22, 2021, the entire contents of which are incorporated herein by reference.

FIELD

The technique shown here relates to a storage medium having stored therein a game program, an information processing system, an information processing apparatus, and a game processing method, which allow a user to edit arrangement of objects in a virtual space.

BACKGROUND AND SUMMARY

Conventionally, there is a game in which a user is allowed to edit arrangement of objects in an area, in a virtual space, where the objects are arranged (e.g., a room where furniture articles are arranged).

In the above game, after editing regarding arrangement of objects has been completed, effective presentation for showing the arrangement of the objects to the user may be desired.

Therefore, the present application discloses a storage medium having stored therein a game program, an information processing system, an information processing apparatus, and a game processing method, which are capable of effectively performing presentation for showing arrangement of objects to the user.

(1) An example of a storage medium described in the present specification has a game program stored therein. An example of the game program causes a processor of an information processing apparatus to execute the following processes.

Performing, in a predetermined area in a virtual space, editing including at least one of selecting a placement object to be placed in the area, placing the placement object, and moving the placement object, on the basis of an operation input;

Performing presentation upon completion according to a completion instruction based on an operation input or according to a predetermined completion condition being satisfied, the presentation including at least one scene, the presentation displaying, for each scene, an image of the area based on a virtual camera;

In the scene, setting a gaze point of the virtual camera at any of a position of the placement object placed in the area, a predetermined position in the area, and a position of a character arranged in the area.

In the scene, setting the virtual camera at a position at which the placement object placed in the area is not placed.

According to the configuration of the above (1), since the presentation upon completion is performed by using the image generated based on the virtual camera set at a position where no placement object is placed, the presentation can be effectively performed.

(2) The presentation upon completion may include a plurality of scenes. The game program may cause the processor to execute, for each of the plurality of scenes, resetting the gaze point of the virtual camera, and resetting the position of the virtual camera.

According to the configuration of the above (2), since the gaze point and the position of the virtual camera can be changed for each of the plurality of scenes, a wide variety of presentation can be performed.

(3) The game program may cause the processor to execute setting the gaze point of the virtual camera, according to an order set in advance for each scene, from any of the position of the placement object placed in the area, the predetermined position in the area, and the position of the character arranged in the area.

According to the configuration of the above (3), the gaze point can be set on any of various objects and positions in the area, whereby a wide variety of scenes can be displayed.

(4) The game program may cause the processor to execute, in the scene, changing at least one of a position, an orientation, and an angle of view of the virtual camera, from a state, of the virtual camera, that is set at start of the scene.

According to the configuration of the above (4), each scene can be displayed through active presentation.

(5) The game program may cause the processor to execute: selecting, for each scene, one of a plurality of control methods that are set in advance regarding the virtual camera; and controlling, based on the control method selected for each scene, at least one of the position, the orientation, and the angle of view of the virtual camera in the scene.

According to the configuration of the above (5), since the virtual camera control method can be varied for each scene, variations of presentation upon completion can be increased.

(6) The control method selectable in the selecting may vary depending on which of the position of the placement object, the predetermined position in the area, and the position of the character is the position of the gaze point.

According to the configuration of the above (6), the virtual camera can be controlled by a control method according to the type of a target on which the gaze point is set.

(7) The control method may be selected at random.

According to the configuration of the above (7), scenes of different contents can be generated each time presentation upon completion is performed, whereby presentation that keeps the user from getting bored can be performed.

(8) The area may be a room in the virtual space. The predetermined position in the area may be a position in the room.

According to the configuration of the above (8), presentation showing the state inside the room in the virtual space can be effectively performed.

(9) In the scene in which the gaze point is set at the predetermined position in the room, the position of the virtual camera may be set outside the room.

According to the configuration of the above (9), the possibility that the placement object in the area interferes with the virtual camera can be reduced.

(10) In the scene in which the gaze point is set at the predetermined position in the room and the position of the virtual camera is set outside the room, the virtual camera may be controlled based on any of a plurality of control methods including a method of moving the virtual camera in parallel, and a method of rotating and moving the virtual camera with the gaze point being fixed.

According to the configuration of the above (10), the virtual camera can be moved without interfering with the placement object in the room.

(11) The area may be a room in the virtual space. In the scene in which the gaze point is set on the placement object or the character, the virtual camera may be set at a position at which the placement object placed in the room is not placed.

According to the configuration of the above (11), the possibility that the placement object or the character at the position of the gaze point is blocked by another placement object and is not appropriately displayed, can be reduced.

(12) In the scene in which the gaze point is set on the placement object or the character, the position of the virtual camera may be set to a position among positions, in the room, at which the placement object is not placed, based on a priority that is set based on a direction of the placement object or the character arranged at the gaze point.

According to the configuration of the above (12), the virtual camera can be easily arranged at a position suitable for the direction of the placement object or the character at the position of the gaze point.

(13) In the scene in which the gaze point is set on the placement object or the character, the virtual camera may be controlled based on any of a plurality of control methods excluding a control method of changing the position of the virtual camera in a horizontal direction in the virtual space.

According to the configuration of the above (13), the possibility that the virtual camera moving in the scene interferes with the placement object in the area, can be reduced.

(14) The character may be a non-player character that is arranged in the area according to the completion instruction or according the completion condition being satisfied.

According to the configuration of the above (14), the character related to the editing area can be presented to the user together with the editing area in the presentation upon completion.

(15) The area may be an area that is set outdoors in the virtual space. The predetermined position in the area may be a position of sky, a predetermined geographical feature, or a predetermined building in the virtual space.

According to the configuration of the above (15), variations of presentation upon completion regarding outdoors in the virtual space can be increased.

In the present specification, examples of an information processing apparatus and an information processing system for executing the processes in the above (1) to (15) are disclosed. Moreover, in the present specification, an example of a game processing method for executing the processes in the above (1) to (15) is disclosed.

According to the storage medium, the information processing system, the information processing apparatus, and the game processing method described above, presentation for showing arrangement of objects to the user can be effectively performed.

These and other objects, features, aspects and advantages of the exemplary embodiment will become more apparent from the following detailed description when taken in conjunction with the accompanying drawings.

DETAILED DESCRIPTION OF NON-LIMITING EXAMPLE EMBODIMENTS

1. Configuration of Game System

A game system according to an example of an exemplary embodiment is described below. An example of a game system 1 according to the exemplary embodiment includes a main body apparatus (an information processing apparatus; which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment is described, and then, the control of the game system 1 according to the exemplary embodiment is described.

Figure 1:
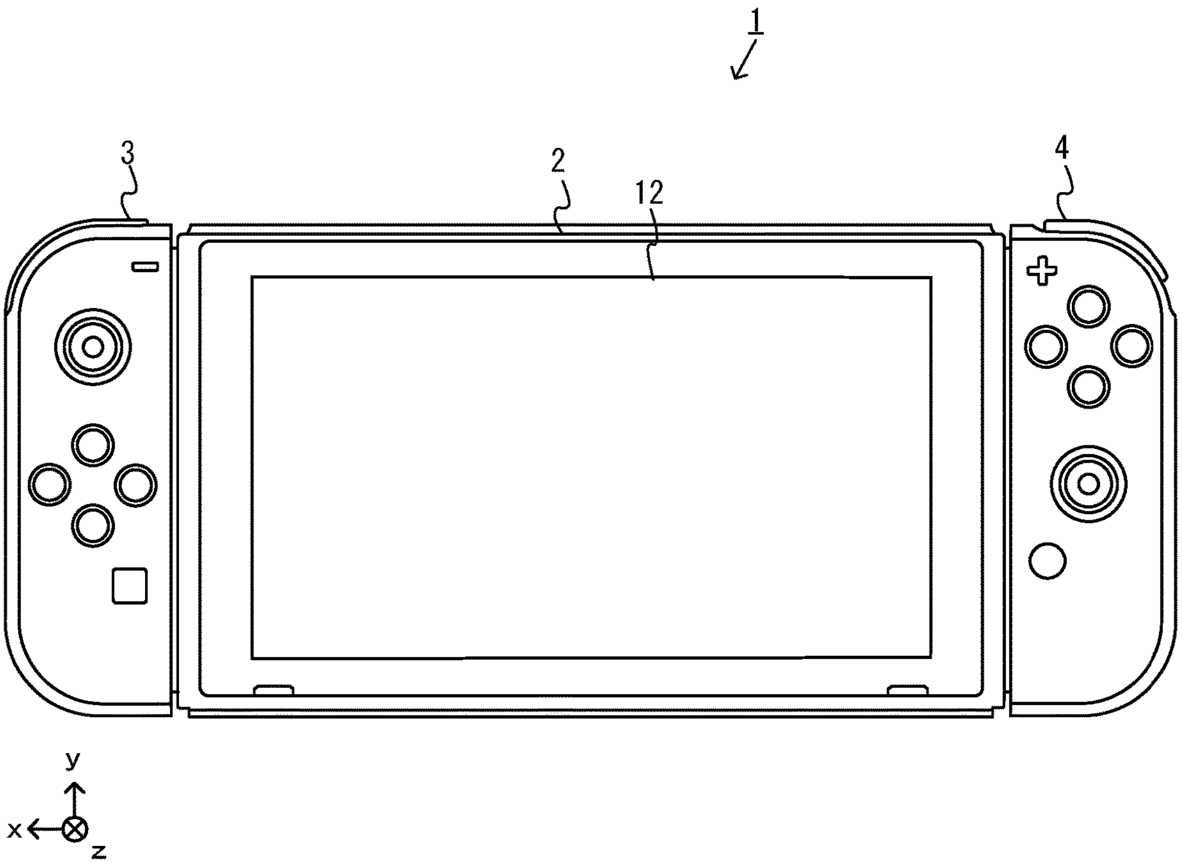
FIG. 1 is a diagram showing an example of the state where a non-limiting left controller and a non-limiting right controller are attached to a non-limiting main body apparatus.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
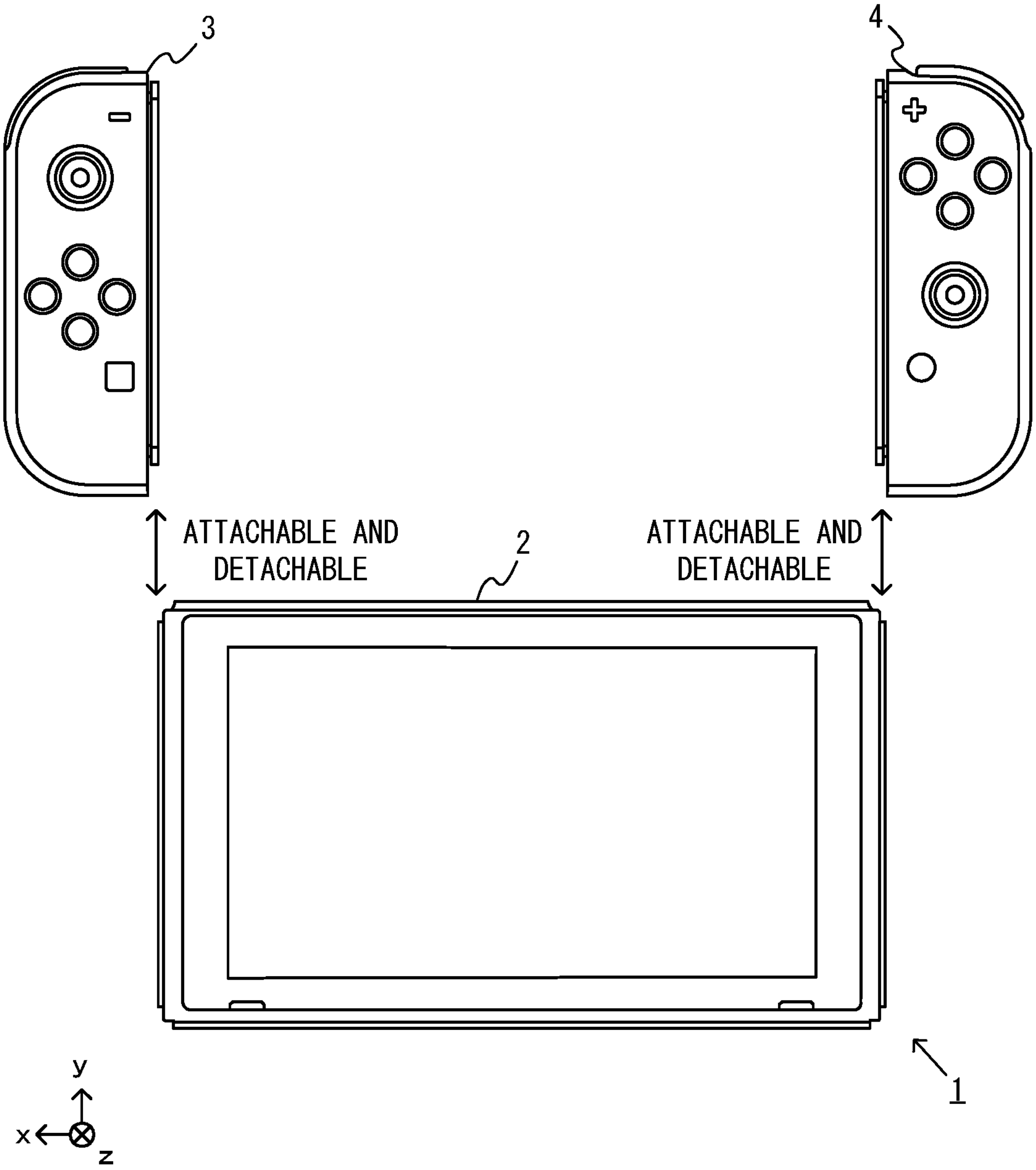
FIG. 2 is a diagram showing an example of the state where each of the non-limiting left controller and the non-limiting right controller is detached from the non-limiting main body apparatus.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
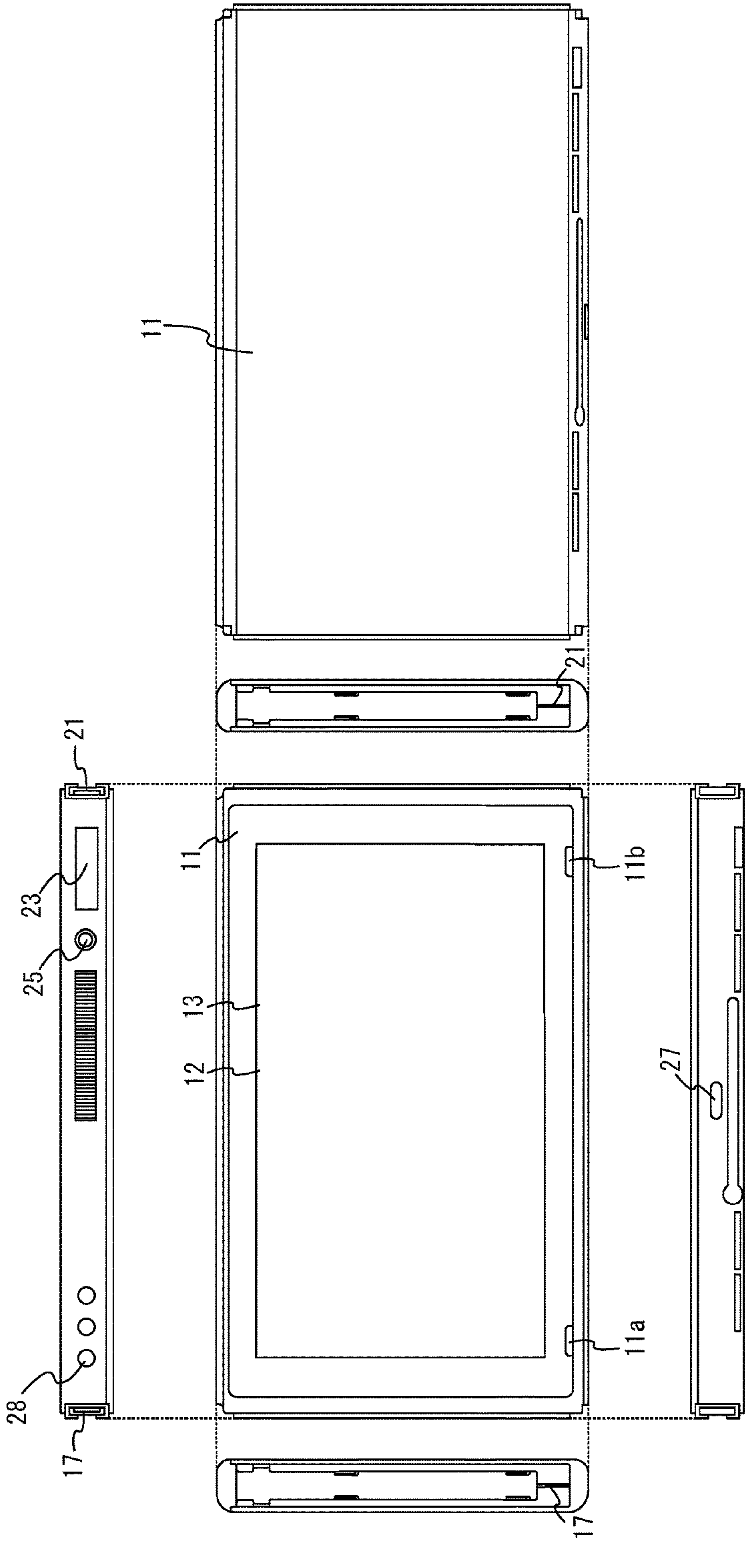
FIG. 3 is six orthogonal views showing an example of the non-limiting main body apparatus.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11*a* and 11*b* are formed on the main surface of the housing 11. Then, sounds output from the speakers 88 are output through the speaker holes 11*a* and 11*b*.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and output from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Figure 4:
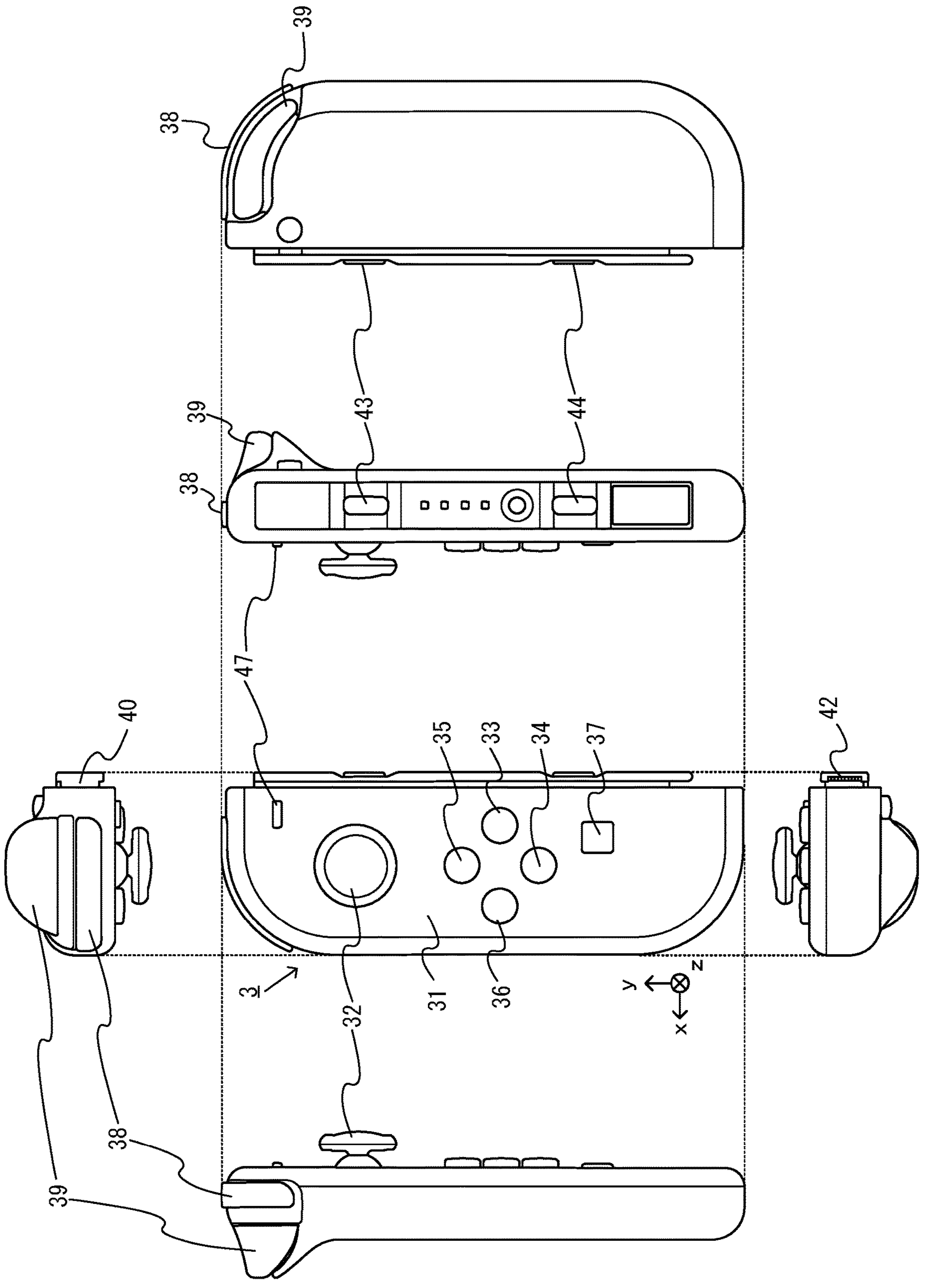
FIG. 4 is six orthogonal views showing an example of the non-limiting left controller.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (i.e., a y-axis direction shown in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
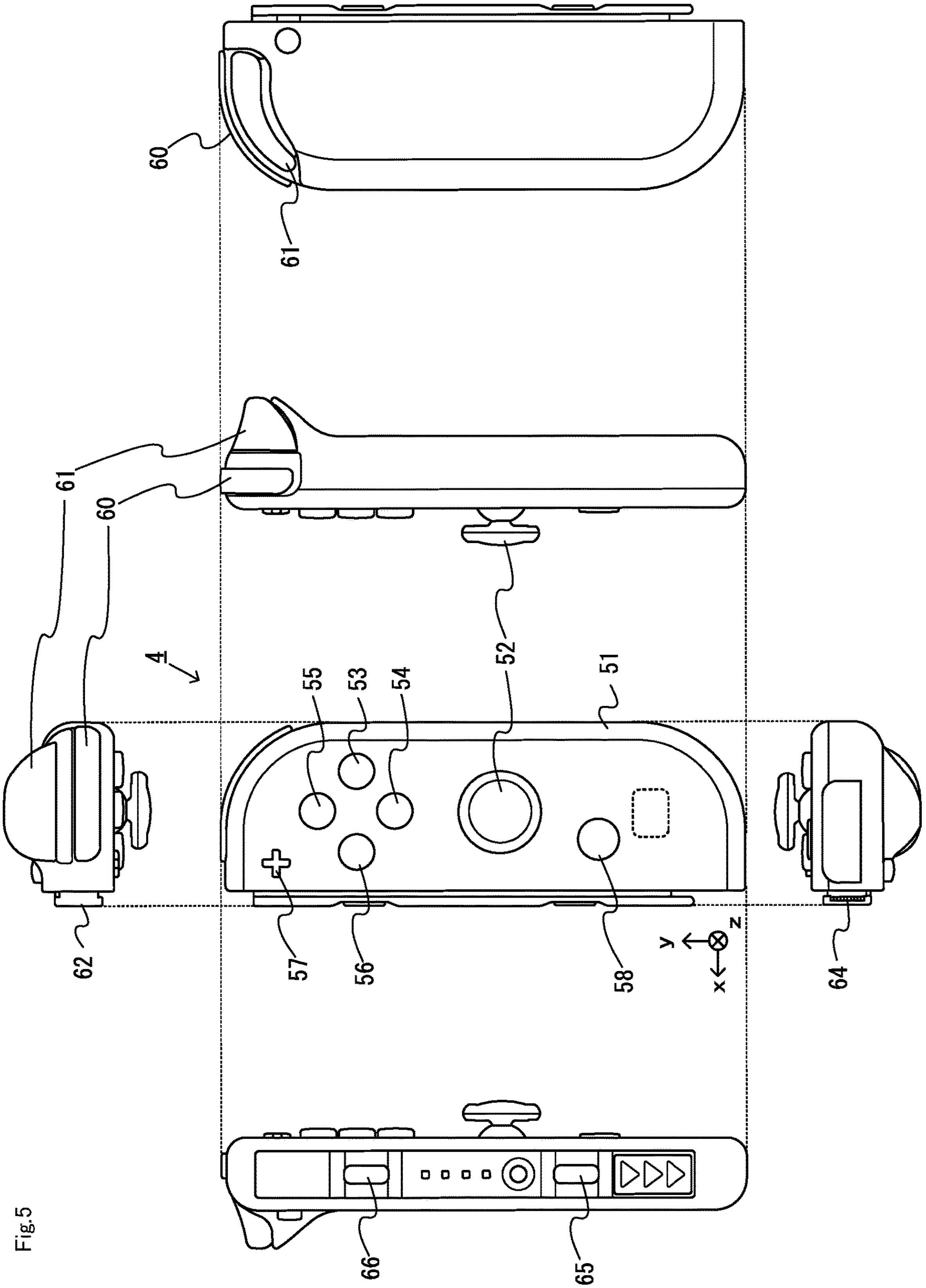
FIG. 5 is six orthogonal views showing an example of the non-limiting right controller.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
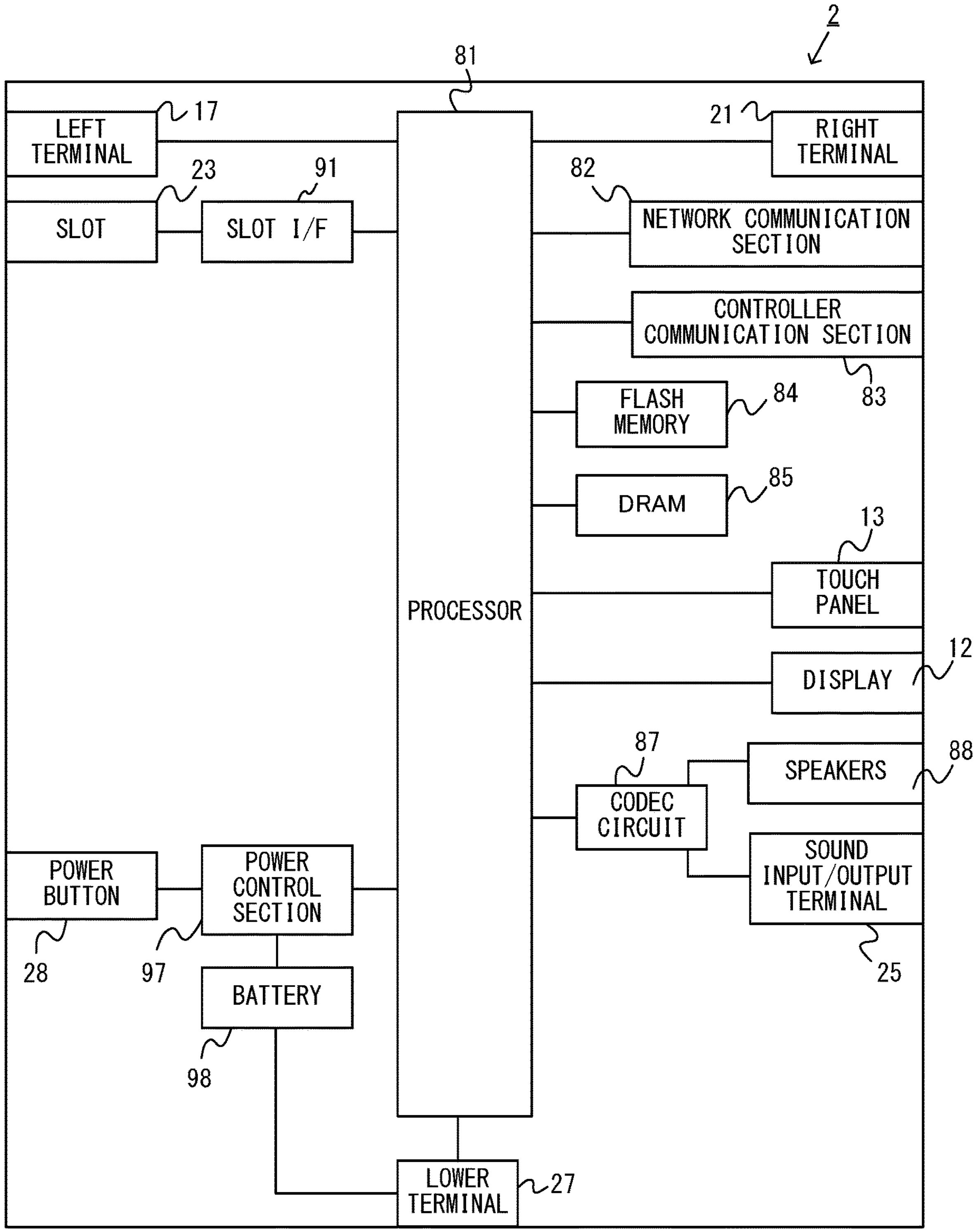
FIG. 6 is a block diagram showing an example of the internal configuration of the non-limiting main body apparatus.

FIG. 6 is a block diagram showing an example of the internal configuration of the main body apparatus 2. The main body apparatus 2 includes components 81 to 85, 87, 88, 91, 97, and 98 shown in FIG. 6 in addition to the components shown in FIG. 3. Some of the components 81 to 85, 87, 88, 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
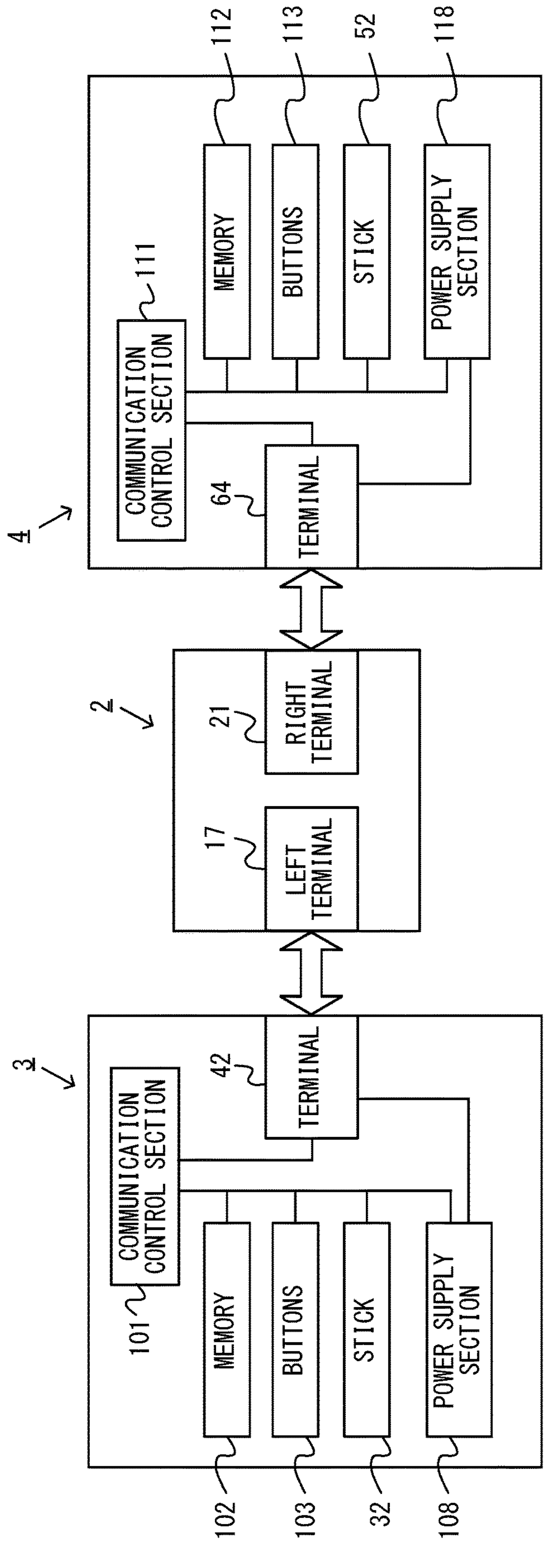
FIG. 7 is a block diagram showing an example of the internal configurations of the non-limiting main body apparatus and the non-limiting left and right controllers.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The communication control section 101 acquires information regarding an input (specifically, information regarding an operation or the detection result of the sensor) from each of input sections (specifically, the buttons 103 and the analog stick 32). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data.

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113 and the analog stick 52. These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

2. Outline of Processing in Game System

Next, an outline of processing executed in the game system 1 will be described with reference to FIGS. 8 to 15. In the exemplary embodiment, the game system 1 executes a game in which an object is placed in a game space which is a virtual space. In the exemplary embodiment, in the game, a user (also referred to as a player) can perform editing of an object placed in a predetermined editing area in the game space. The specific content of the editing area is discretionary. In the exemplary embodiment, the editing area may be a room of a character that appears in the game, or a yard of a house of the character.

Figure 8:
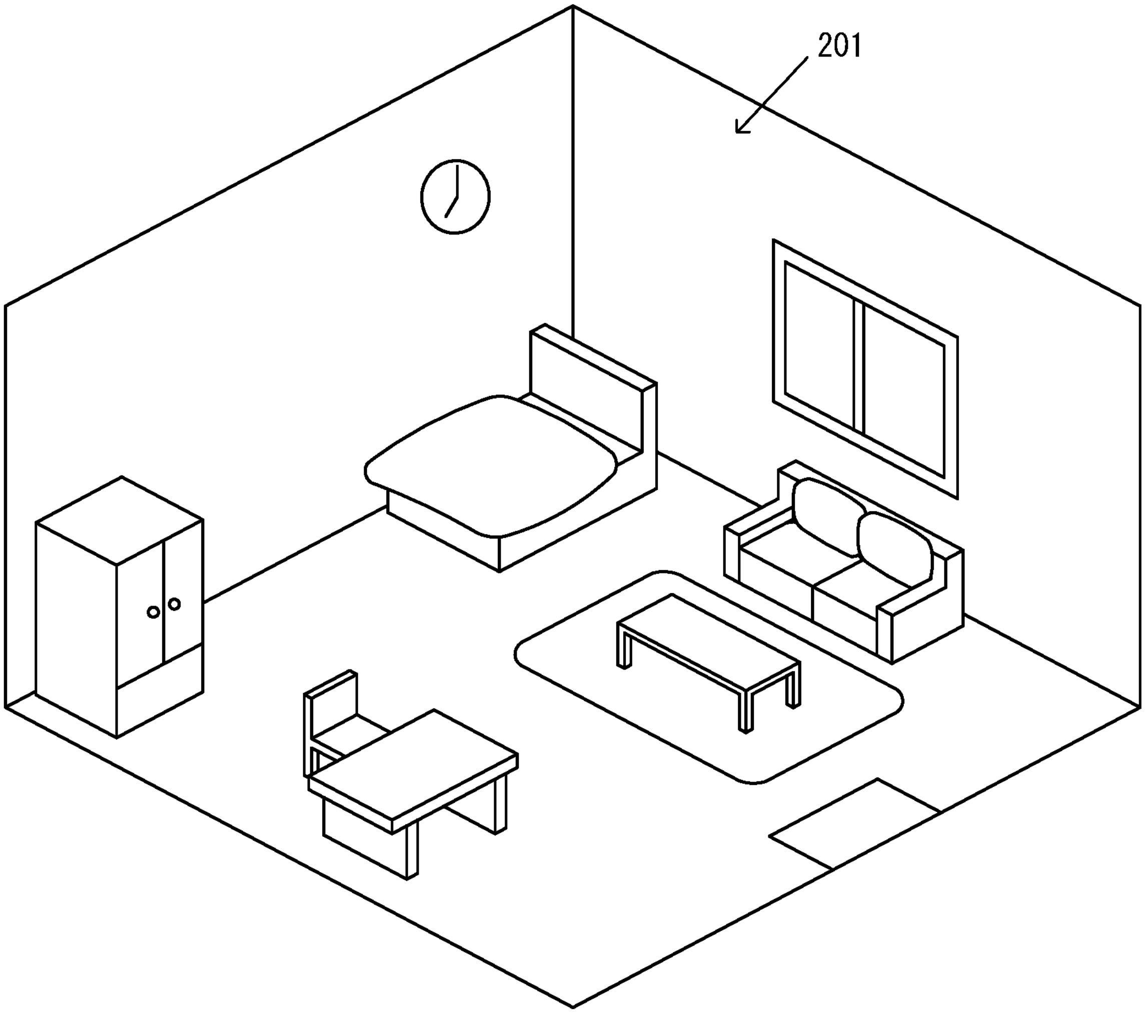
FIG. 8 shows an example of a room in a game space according to an exemplary embodiment.

FIG. 8 shows an example of the room in the game space according to the exemplary embodiment. A room 201 shown in FIG. 8 is an example of the editing area on which the user can perform editing. As shown in FIG. 8, one or more placement objects are placed in the room 201. Each placement object is an object on which the user can perform editing regarding placement thereof in the editing area. Specifically, examples of the placement objects include furniture objects such as a desk and a bed, and objects of items such as a clock and a vase. The specific contents of the placement objects are discretionary. The specific examples of the placement objects may include objects of types other than furniture and items.

In the exemplary embodiment, the user can make an instruction for editing a placement object in the room 201. For example, the user can start an editing mode during the game, and can make the instruction for editing during the editing mode. That is, the game system 1 performs editing regarding the placement object in the room 201, based on an operation input performed by the user. The "editing regarding a placement object" includes: designating an object to be placed in the area; placing the designated object in the area; moving the object placed in the area; deleting, from the area, the object placed in the area; and the like. This allows the user to place a desired placement object in the room 201, and arrange the placement object at a desired position and in a desired direction in the room 201.

In the exemplary embodiment, the user can perform editing of placement objects in a room of a player character that the user operates, and a room of a character (e.g., a non-player character that appears in the game) different from the player character. For example, in the game, the player character is requested by the non-player character to perform room coordination, and the user, when receiving the request, can edit the room of the non-player character.

In the exemplary embodiment, when editing of the room of the non-player character has been completed, the game system 1 executes presentation upon completion. The presentation upon completion is, for example, presentation for introducing the state of the edited room (specifically, the state of arrangement of placement objects). The condition for executing the presentation upon completion (in other words, the condition for determining that editing of the room has been completed) is discretionary. For example, the presentation upon completion may be executed when the user has performed a completion instruction, or when a completion condition defined in the game (e.g., a predetermined number of placement objects having been placed, or a time limit having expired) has been satisfied.

In the exemplary embodiment, the editing area is not limited to the room shown in FIG. 8, and the user can also edit an outdoor area in the game space. For example, in the exemplary embodiment, the player character can edit a yard of a house of a non-player character in response to a request from the non-player character. In another embodiment, the specific content of the editing area is discretionary, and may be an area other than the room and the yard.

[2-1. Outline of Presentation Upon Completion]

Next, an outline of presentation upon completion will be described. In the following description, presentation upon completion in the case where the editing area is a room will be mainly described, and only differences from the above case will be described for presentation upon completion in the case where the editing area is a yard.

In the presentation upon completion, the game system 1 sets a virtual camera at an appropriate position in the game space, and generates and displays a game image indicating the state inside the editing area. In the exemplary embodiment, the presentation upon completion includes a plurality of scenes. In each scene, various parameters (gaze point, position, orientation, angle of view, etc.) regarding the virtual camera are set, and an image of the editing area is generated and displayed based on the set parameters. The parameters are set to change for each scene (may happen to be the same between scenes). That is, in the exemplary embodiment, each time the scene changes, the gaze point (in other words, an imaging target), the position, the orientation, the angle of view, and/or the like of the virtual camera, change.

Specifically, in the exemplary embodiment, the presentation upon completion includes an intro-scene, a plurality of (here, five) intermediate scenes, and an outro-scene. In the intro-scene and the outro-scene, the various parameters of the virtual camera are set to predetermined values. For example, in the intro-scene, the virtual camera is set at a predetermined position (e.g., an entrance of the room or the yard) in the editing area, and the parameters of the virtual camera are set such that the whole or almost the whole of the editing area is in the field-of-view range of the virtual camera. Meanwhile, for example, in the outro-scene, the gaze point of the virtual camera is set at the center of the editing area, and the parameters of the virtual camera are set such that the whole or almost the whole of the editing area is in the field-of-view range of the virtual camera.

In an intermediate scene, the various parameters of the virtual camera are dynamically set for each scene. That is, in the intermediate scene, the gaze point, the position, the orientation, the angle of view, and/or the like of the virtual camera, change for each scene. Thus, camera work in the presentation upon completion changes every time, which prevents the user from getting bored with the presentation. In another embodiment, even in the intro-scene and the outro-scene, the various parameters of the virtual camera may be dynamically set as in the intermediate scene.

In the intermediate scene, first, the game system 1 sets the gaze point of the virtual camera. Next, the game system 1 sets the initial state (in the exemplary embodiment, the position, the orientation, and the angle of view), other than the gaze point, of the virtual camera in the scene. Next, the game system 1 sets a method for controlling the virtual camera (specifically, how to move the virtual camera, and how to change the angle of view) in the scene. In the following description, a method for setting the virtual camera in an intermediate scene will be described.

[2-2. Setting of Gaze Point in Intermediate Scene]

In the exemplary embodiment, the game system 1 sets the gaze point of the virtual camera in an intermediate scene, at one of (a) a reference gaze position, (b) the position of a character arranged in the editing area, and (c) the position of a placement object placed in the editing area.

In the exemplary embodiment, which one of the above (a) to (c) is selected as a gaze point setting target has been determined in advance in each of the five intermediate scenes included in one presentation upon completion. More specifically, which one of the above (a) to (c) is selected as a gaze point setting target is set for each of the five intermediate scenes according to a predetermined order. A specific method regarding the above selection is discretionary. For example, in another embodiment, the game system 1 may select, at random, any of the above (a) to (c) as a gaze point setting target in each of the five intermediate scenes. More specifically, the game system 1 may perform the selection at random such that each of the above (a) to (c) is selected at least once in one presentation upon completion.

Figure 9:
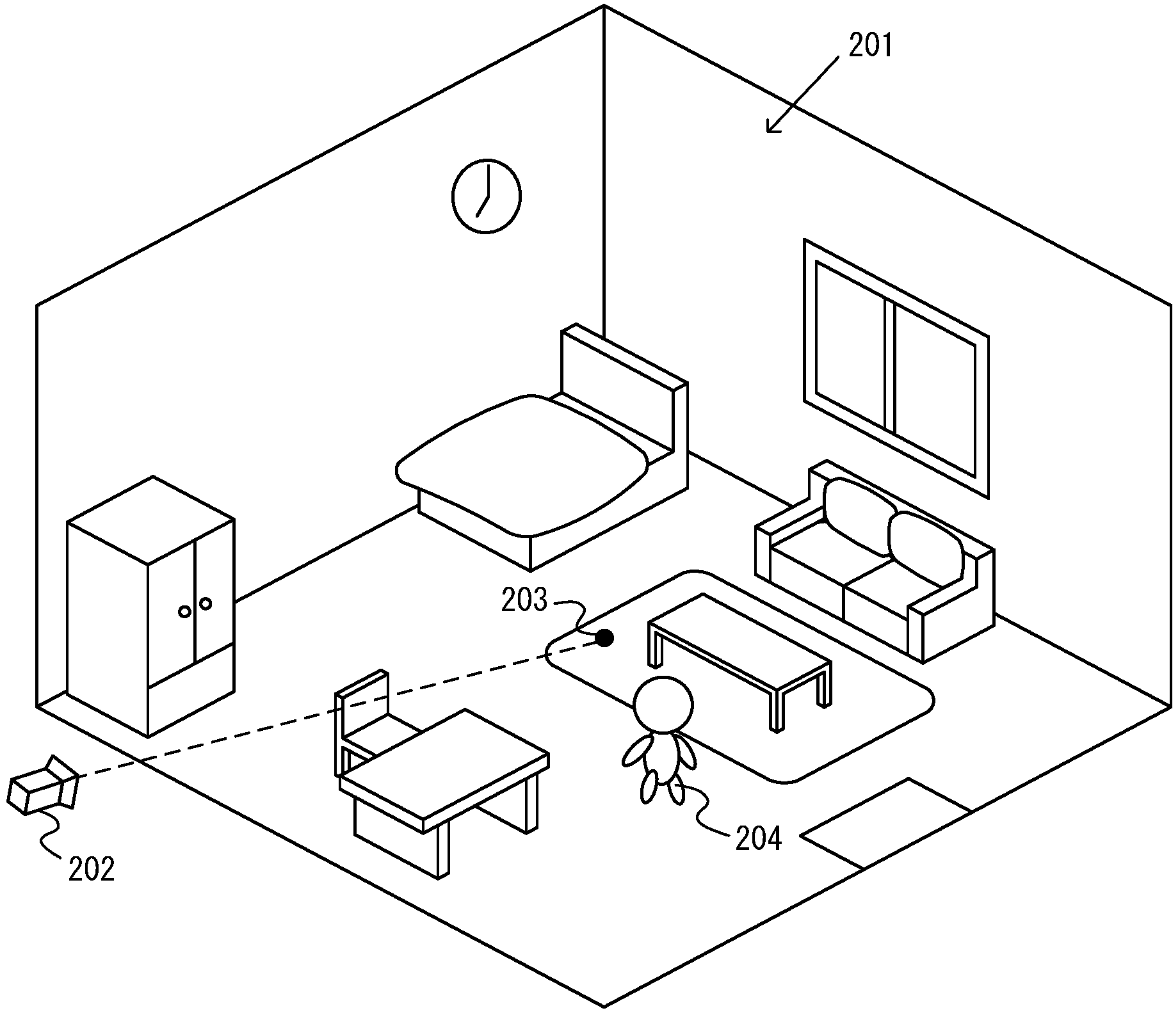
FIG. 9 shows an example of a room in a case where a gaze point of a virtual camera is set at a reference gaze position.

FIG. 9 shows an example of the room in the case where the gaze point of the virtual camera is set at the reference gaze position. The above (a), i.e., the reference gaze position, is a position predetermined in the game program for the game. In the example shown in FIG. 9, a reference gaze position 203, at which the gaze point of a virtual camera 202 is set, is a position at the center of the editing area (i.e., the room 201). More exactly, the "position at the center of the editing area" is a position at the center of the editing area with respect to the horizontal direction, and the reference gaze position 203 is a position at the center of the room 201 with respect to the horizontal direction and at a predetermined height from a floor of the room 201. Moreover, in the exemplary embodiment, the reference gaze position in the case where the editing area is a room is inside the editing area. In another embodiment, the reference gaze position may be outside the editing area.

In the exemplary embodiment, one reference gaze position is set. In another embodiment, a plurality of reference gaze positions may be set. At this time, the game system 1 may select one of the plurality of reference gaze positions, and may set the gaze point of the virtual camera at the selected reference gaze position.

Figure 10:
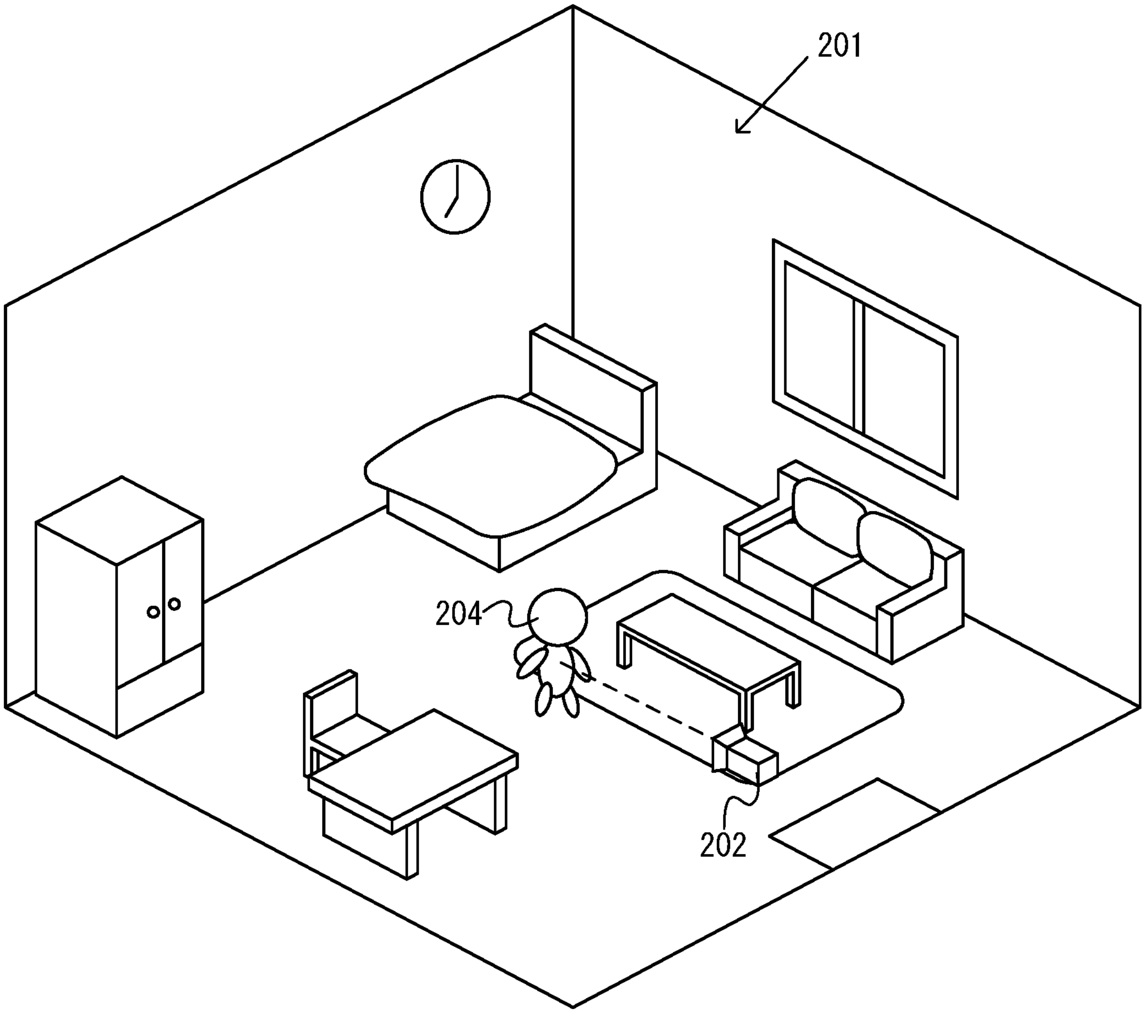
FIG. 10 shows an example of a room in a case where the gaze point of the virtual camera is set on a character.

FIG. 10 shows an example of the room in the case where the gaze point of the virtual camera is set on a character. In the example shown in FIG. 10, the character on which the gaze point of the virtual camera 202 is set is, for example, a non-player character 204 that has requested coordination of the editing area (in other words, a non-player character living in the room or the yard). In the exemplary embodiment, in each scene in the presentation upon completion, the non-player character 204 is arranged in the editing area. That is, the character on which the gaze point is set is the non-player character 204 that is arranged in the editing area according to the completion instruction, or according to the completion condition having been satisfied. Thus, in the presentation upon completion, the non-player character 204 related to the editing area can be presented to the user together with the editing area.

In the example shown in FIG. 10, in the case where the gaze point of the virtual camera 202 is set on a character, the non-player character 204 is arranged at a certain position (referred to as "character position") in the editing area, and the gaze point is set at the position of the non-player character 204. The character position is discretionary, and a method for determining the character position is also discretionary. For example, if a placement object is not placed at the center of the editing area, the game system 1 sets the center position as the character position. If a placement object is placed at the center of the editing area, the game system 1 may set, as the character position, a position that is as close to the center as possible and has no placement object placed therein. A method for determining the direction of the non-player character 204 arranged at the character position is also discretionary. For example, the game system 1 determines the direction of the non-player character 204 at random.

There may be a plurality of candidates of the character on which the gaze point of the virtual camera 202 can be set. For example, when there are a plurality of non-player characters living in the editing area, these non-player characters may be regarded as the candidates. At this time, the game system 1 may determine the character on which the gaze point of the virtual camera is to be set, by any method. For example, the game system 1 may select one character from among the plurality of candidates according to a predetermined order, or at random.

Figure 11:
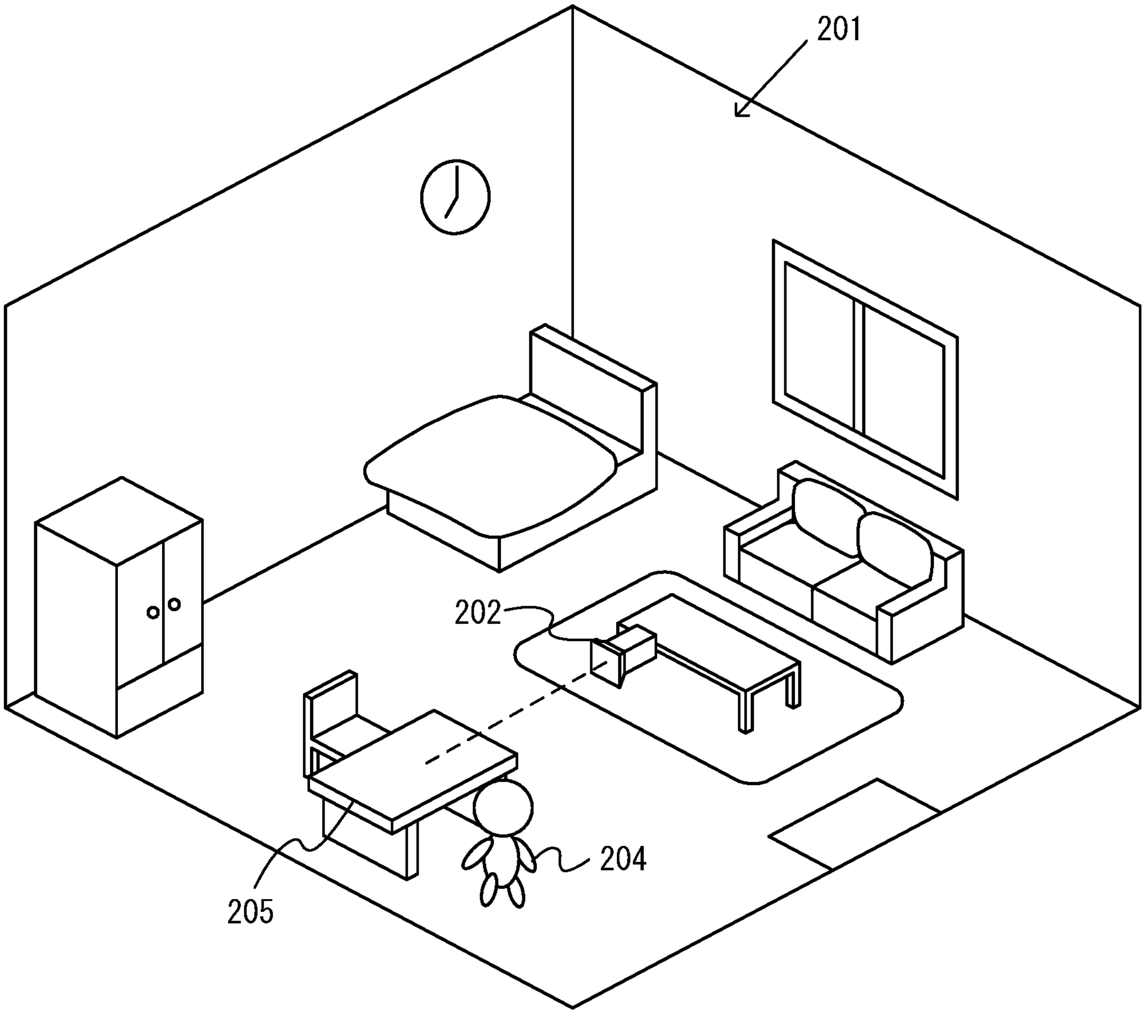
FIG. 11 shows an example of a room in a case where the gaze point of the virtual camera is set on a placement object.

FIG. 11 shows an example of the room in the case where the gaze point of the virtual camera is set on a placement object. In the example shown in FIG. 11, a placement object 205 on which the gaze point of the virtual camera 202 is set is a table object. As for the placement object regarding the above (c), the game system 1 selects one object on which the gaze point is to be set, from among one or more placement objects placed in the editing area. When there are a plurality of placement objects, a specific method for selecting one object from the plurality of placement objects is discretionary. For example, the game system 1 may select one object from the plurality of placement objects at random.

In this specification, "selecting at random" means not only selecting each candidate with an equal probability, but also selecting a candidate such that the selection result has randomness (i.e., such that the selection results for a plurality of times of selection are not the same). For example, the game system 1 may select a placement object on which the gaze point is to be set, by a method in which a specific placement object or a placement object on which the gaze point is not yet set in the current presentation upon completion is more likely to be selected as compared to other placement objects. Meanwhile, for example, the game system 1 may select a placement object on which the gaze point is to be set, by a method in which a specific placement object among a plurality of placement objects or a placement object on which the gaze point has been set in the current presentation upon completion is not selected (or is less likely to be selected as compared with other placement objects). The "specific placement object" is, for example, a placement object associated with the non-player character 204 living in the room 201 (e.g., a placement object that the non-player character 204 has requested placement thereof), or a placement object of a specific type.

In the exemplary embodiment, when the editing area is a yard, the game system 1 can set a position other than the center of the editing area, as the reference gaze position regarding the above (a). Specifically, when the editing area is a yard, positions that can be the reference gaze position are as follows: a position above the editing area (e.g., the position of the sky); the position of a predetermined geographical feature (e.g., a bridge) in the yard; and the position of an object that is placed in the yard and is not a placement object (e.g., an object of a building such as a house). That is, in the case where the editing area is a yard, when the gaze position of the virtual camera 202 is set on the reference gaze position, the game system 1 selects, as the reference gaze position, one of the center position in the editing area and the aforementioned three positions, thereby setting the gaze position of the virtual camera 202. A specific method of this selection is discretionary, and may be a method of random selection, for example.

As described above, in the exemplary embodiment, the editing area may be an outdoor area in the virtual space. At this time, the reference gaze position in the editing area may be the position of the sky, the position of a geographical feature (e.g., a bridge), or the position of a predetermined building (e.g., a house) in the virtual space. Thus, variations of camera work in each scene in the presentation upon completion can be increased.

[2-3. Setting of Initial State of Virtual Camera in Intermediate Scene]

After the gaze point of the virtual camera in the intermediate scene has been set, the game system 1 sets the initial state, other than the gaze point, of the virtual camera 202 in the intermediate scene. Specifically, the position, the orientation, and the angle of view of the virtual camera 202 are set. Hereinafter, a method for setting the initial state of the virtual camera 202 will be described for each of the types (i.e., the above (a) to (c)) of the gaze point of the virtual camera.

First, the setting method in the case where the gaze point of the virtual camera 202 is set at the reference gaze position will be described. In this case, the game system 1 sets the initial position of the virtual camera 202 at a position outside the editing area. In the exemplary embodiment, the game system 1 selects one position from among candidate positions set in all directions around the editing area (specifically, north, south, east and west directions in the game space), and sets the virtual camera 202 at the selected position. A specific method for this selection is discretionary. For example, one position may be selected at random from among the plurality of candidate positions. At this time, the game system 1 may select a candidate position at random such that a candidate position that has already been selected in the intermediate scene in the current presentation upon completion is less likely (or not likely) to be selected.

Since the gaze point of the virtual camera 202 is set at the reference gaze position in the editing area as described above, the orientation of the virtual camera 202 is set such that the virtual camera 202 faces the reference gaze position in the editing area from the outside of the editing area (see FIG. 9). Furthermore, the game system 1 sets the angle of view of the virtual camera 202 to a predetermined angle of view (e.g., an angle of view at which almost the whole of the room is included in the field of view).

As described above, in the exemplary embodiment, the editing area may be a room, and the reference gaze position may be a position in the room. At this time, in the intermediate scene in which the gaze point of the virtual camera 202 is set at the position in the room, the game system 1 sets the virtual camera 202 at a position outside the room. Thus, the virtual camera 202 can be set at the position where the placement object in the editing area does not interfere with the virtual camera 202. Furthermore, although described in detail later, the virtual camera 202 can be freely moved from the initial position without interfering with the placement object in the editing area.

Next, the initial position setting method in the case where the gaze point of the virtual camera 202 is set on a character will be described. In this case, the game system 1 sets, as the initial position of the virtual camera 202, a position within the editing area and around the character (see FIG. 10). Hereinafter, an example of the initial position determination method in the above case will be described with reference to FIG. 12.

Figure 12:
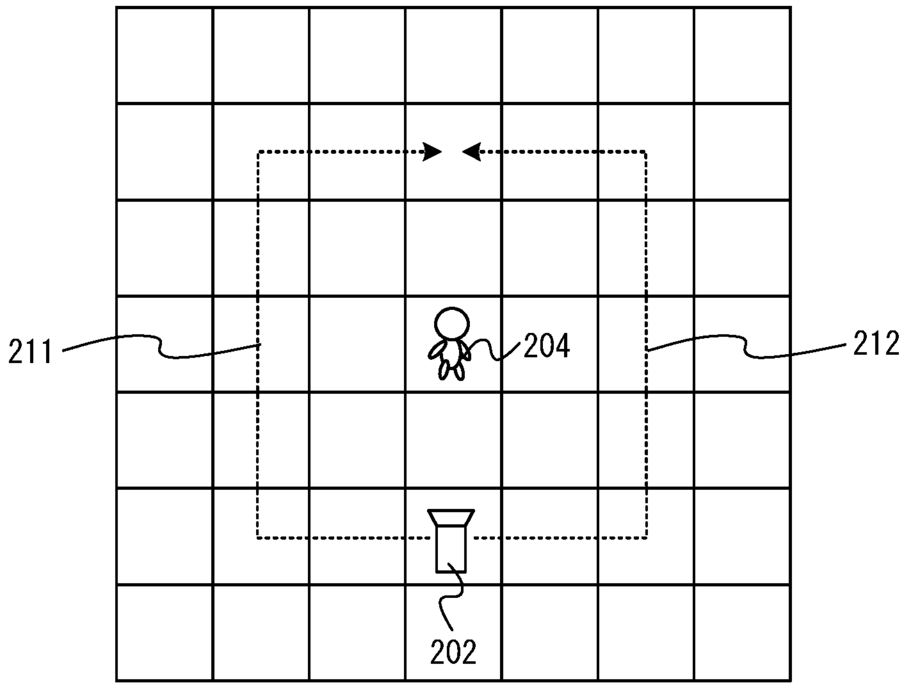
FIG. 12 shows an example of a method for determining an initial position of the virtual camera in a case where the gaze point of the virtual camera is set on a character.

FIG. 12 shows an example of the method for determining the initial position of the virtual camera in the case where the gaze point of the virtual camera is set on a character. FIG. 12 schematically shows a part of the editing area (room) as viewed from above. In the exemplary embodiment, squares forming a grid are set on the editing area (see FIG. 12), and a placement object can be placed in units of squares (e.g., in units of 0.5 squares). FIG. 12 schematically shows arrangement of the virtual camera 202 and the non-player character 204 (i.e., the character set at the gaze point) by using the squares.

In the case where the gaze point of the virtual camera is set on the character, the game system 1 first sets a search start position for searching for the initial position of the virtual camera 202. In the exemplary embodiment, the search start position is the position of a square that is two squares apart from the square where the non-player character 204 is present and that is located in the forward direction of the non-player character 204 (in FIG. 12, the square where the virtual camera 202 is arranged). Although described in detail later, it can be said that the search start position is a position that is most preferentially set as the initial position of the virtual camera 202. Since the position located in the forward direction of the non-player character 204 is the search start position, the virtual camera 202 can easily capture the non-player character 204 from the front side at the time of starting the intermediate scene. Thus, the scene, in which the user can easily recognize the non-player character 204, can be generated.

Next, the game system 1 sets two search paths 211 and 212 each extending from the square at the search start position to a square located in the backward direction of the non-player character 204 through the side of the non-player character 204. The two search paths 211 and 212 are set so as to surround the non-player character 204 (see FIG. 12). Each of the search paths 211 and 212 is set so as to pass through a square that is two squares apart from the square where the non-player character 204 is present.

As described above, the search paths shown in FIG. 12 are set based on the squares used for placement of placement objects. In another embodiment, a search path may not necessarily be set based on the squares, and may be set at any position in the game space (the same applies to search paths shown in FIG. 13 to FIG. 15). For example, a circular search path may be set so as to surround a target (i.e., a character or a placement object) located at the gaze point when the game space is viewed from above.

The game system 1 performs search for a position that satisfies an initial arrangement condition, from the search start position along the search paths 211 and 212. In the exemplary embodiment, the initial arrangement condition regarding a certain position is that the virtual camera 202 can be arranged at this position and no placement object is placed between this position and the position of the gaze point. The position at which the virtual camera 202 can be arranged is a position where no placement object is placed. Whether or not a placement object is placed between the position and the position of the gaze point is determined according to whether or not a placement object is placed in a square between a square corresponding to the position and a square corresponding to the gaze point. In another embodiment, the content of the initial arrangement condition is discretionary. The initial arrangement condition regarding a certain position may include only that the virtual camera 202 can be arranged at this position.

As described above, the game system 1 searches for a position satisfying the condition that no placement object is placed at the position and no placement object is placed between the position and the position of the gaze point, from the search start position along the search paths 211 and 212 in order. In the exemplary embodiment, this search is performed for each predetermined distance (e.g., a distance equivalent to 0.5 square) on the search path. That is, the game system 1 determines whether or not the initial arrangement condition is satisfied at a certain position on the search path, and next performs the same determination as above at a position shifted by the predetermined distance along the search path from the position where the determination has been made.

In the exemplary embodiment, the game system 1 sets, as the initial position of the virtual camera 202, a position that satisfies the initial arrangement condition and has the smallest amount of shift from the search start position (the amount of shift at the search start position is 0). The position having the smallest amount of shift from the search start position can be regarded as a position closest to the forward direction of the non-player character 204 (i.e., a position such that the direction from the non-player character 204 to the position is closest to the forward direction). It is conceivable that the amount of shift at the position satisfying the initial arrangement condition and found on the search path 211 may be equal to the amount of shift at the position satisfying the initial arrangement condition and found on the search path 212. In this case, the game system 1 selects one of these positions by any method (e.g., selects the position on one search path defined in advance) as the initial position of the virtual camera 202.

If a position satisfying the initial arrangement condition has not been found on the search paths 211 and 212, the game system 1 newly sets search paths that are more apart from the non-player character 204 by a predetermined distance (e.g., 0.5 square) than the search paths 211 and 212 (i.e., search paths shifted outward by the predetermined distance with respect to the search paths 211 and 212). Then, the game system 1 performs the above search on the newly set search paths. If a position satisfying the initial arrangement condition has not yet been found, the game system 1 repeats setting of search paths and search on the set search paths until the distance from the non-player character 204 to the search paths reaches a predetermined upper limit value (e.g., a distance equivalent to 4.5 squares).

If a position satisfying the initial arrangement condition has not been found even through the search performed until the distance has reached the upper limit value, the game system 1 resets the gaze point of the virtual camera 202 in the exemplary embodiment. Specifically, in the above case, the game system 1 resets the gaze point of the virtual camera 202 to the reference gaze position. This allows the initial position of the virtual camera 202 to be reliably set. In another embodiment, the game system 1 may repeat setting of search paths and search on the set search paths until a position satisfying the initial arrangement condition is found, without setting the upper limit value.

In the exemplary embodiment, if a position to be searched for in the above search is outside the editing area (i.e., if a part of the search path is outside a wall of the room 201), the game system 1 does not determine the position outside the editing area to be a position satisfying the initial arrangement condition. Specifically, in the above case, the game system 1 may perform the search after correcting the search path so as to be located inside the editing area. When the found position is outside the editing area, the game system 1 may determine that the position does not satisfy the initial arrangement condition.

In the exemplary embodiment, a component, regarding the horizontal direction, of the initial position of the virtual camera 202 is determined by the above search. Meanwhile, a component, regarding the vertical direction (i.e., the height direction in the game space), of the initial position of the virtual camera 202 is set to a predetermined height. In another embodiment, even the component (position) regarding the vertical direction may be determined by the above search. For example, the game system 1 may set a search path at a certain height, and when a position satisfying the initial arrangement condition has not been found on the search path, the game system 1 may set a new search path at a position shifted from the search path in the height direction and perform search again on the new search path.

Since the gaze point of the virtual camera 202 is set at the position of the non-player character 204 as described above, the virtual camera 202 is set in an orientation in which the virtual camera 202 is directed from the initial position to the position of the non-player character 204 (see FIG. 10). Furthermore, the game system 1 sets the angle of view of the virtual camera 202 to a predetermined angle of view (e.g., an angle of view at which the whole of the non-player character 204 is included in the field of view).

Next, the initial position setting method in the case where the gaze point of the virtual camera 202 is set on a placement object will be described. In this case, the game system 1 sets, as the initial position of the virtual camera 202, a position within the editing area and around the placement object (see FIG. 11). Hereinafter, an example of the initial position determination method in the above case will be described with reference to FIG. 13.

Figure 13:
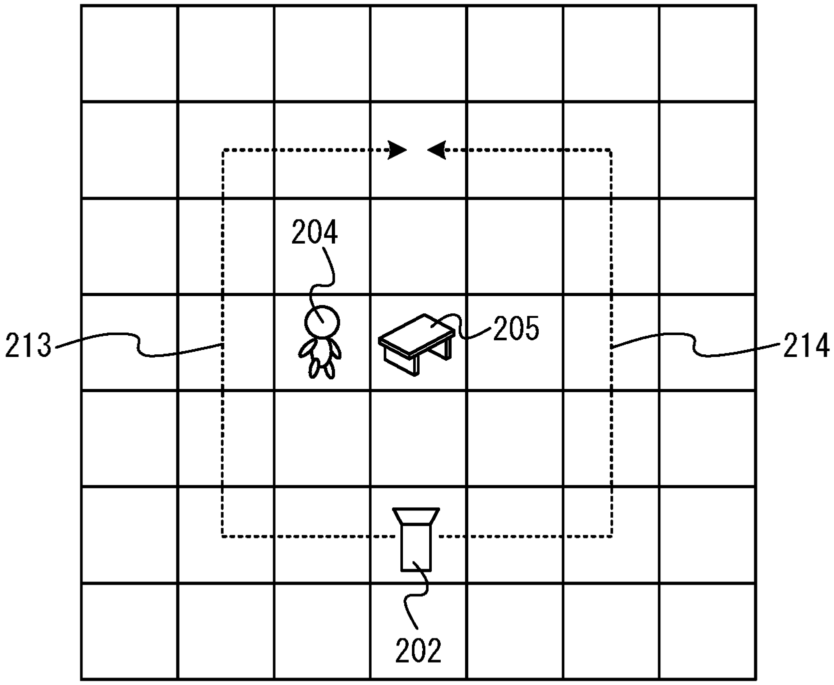
FIG. 13 shows an example of a method for determining an initial position of the virtual camera in a case where the gaze point of the virtual camera is set on a placement object.

FIG. 13 shows an example of the method for determining the initial position of the virtual camera in the case where the gaze point of the virtual camera is set on a placement object. FIG. 13 is similar to FIG. 12 and schematically shows a part of the editing area (room) as viewed from above. FIG. 13 schematically shows arrangement of the virtual camera 202, the non-player character 204, and a placement object 205 set at the gaze point, by using the aforementioned squares.

In the exemplary embodiment, first, the game system 1 arranges the non-player character 204 around the placement object 205 (see FIG. 11). For example, the non-player character 204 is arranged at the position of a square that is adjacent to a square where the placement object 205 is present and that is located in the forward direction of the placement object 205. The non-player character 204 is arranged so as to face the placement object 205.

If the non-player character 204 cannot be arranged at the above position (i.e., if a placement object is placed at the position), the game system 1 arranges the non-player character 204 at the position of a square that is adjacent to the square where the placement object 205 is present and that is located in the lateral direction or the backward direction with respect to the placement object 205. If the non-player character 204 cannot be arranged at the position of the square adjacent to the placement object 205, the game system 1 resets the gaze point of the virtual camera 202. Specifically, in the above case, the game system 1 sets, as the gaze point, the position of another placement object different from the placement object 205, and arranges the non-player character 204 around the another placement object. Thus, the non-player character can be arranged near the placement object. If the non-player character 204 cannot be arranged around any of the placement objects in the editing area, the game system 1 may change the gaze point of the virtual camera 202 to the reference gaze position.

Next, the game system 1 sets a search start position for searching for the initial position of the virtual camera 202. In the case where the gaze point of the virtual camera 202 is set on the placement object 205, the search start position is the position of a square that is two squares apart from the square where the placement object 205 is placed and that is located in a direction at an angle of 90 degrees with respect to the direction in which the non-player character 204 is arranged with respect to the placement object 205 (in FIG.

13, this square is a square where the virtual camera 202 is arranged). Since the search start position is a position that is most preferentially set as the initial position of the virtual camera 202 as described above, the search start position being set as described above allows an image, in which both the placement object 205 and the non-player character 204 are included without overlapping each other, to be easily displayed at the start of the intermediate scene.

Next, the game system 1 sets two search paths 213 and 214 each extending from the square at the search start position to a square on the side opposite to the search start position with respect to the placement object 205, through the side of the placement object 205. The two search paths 213 and 214 are set so as to surround the placement object 205 (and the non-player character 204) (see FIG. 13). Each of the search paths 213 and 214 is set so as to pass through a square that is two squares apart from the square where the placement object 205 is present.

The game system 1 performs search for a position that satisfies the initial arrangement condition, from the search start position along the search paths 213 and 214. The initial arrangement condition in the case where the gaze point of the virtual camera 202 is set on the placement object 205 is the same as the initial arrangement condition in the case where the gaze point of the virtual camera 202 is set on a character. In the case where the gaze point of the virtual camera 202 is set on the placement object 205, the game system 1 first performs search on the search path 214 located in the forward direction of the non-player character 204, and thereafter performs search on the search path 213 located in the backward direction of the non-player character 204. That is, the game system 1 searches for a position satisfying the initial arrangement condition, from the search start position along the search path 214. When a position satisfying the initial arrangement condition has not been found on the search path 214, the game system 1 performs search from the search start position along the search path 213. Thus, the game system 1 can determine the initial position of the virtual camera 202 such that a position, among the positions around the placement object 205, at which the non-player character 204 can be captured from the front side thereof is preferentially selected (over a position at which the non-player character 204 is captured from the back side thereof). The search shown in FIG. 13, similar to the search shown in FIG. 12, is performed for each predetermined distance (e.g., a distance equivalent to 0.5 square) on each search path.

If a position satisfying the initial arrangement condition has not been found on the search paths 213 and 214, the game system 1 newly sets search paths that are more apart from the non-player character 204 by a predetermined distance (e.g., 0.5 square) than the search paths 213 and 214 (i.e., search paths shifted outward by the predetermined distance with respect to the search paths 213 and 214). Then, the game system 1 performs the above search on the newly set search paths. The game system 1 repeats setting of search paths and search on the set search paths until the distance from the placement object 205 to the search paths reaches a predetermined upper limit value (e.g., a distance equivalent to 4.5 squares).

If a position satisfying the initial arrangement condition has not been found even through the search performed until the distance has reached the upper limit value, the game system 1 resets the gaze point of the virtual camera 202 in the exemplary embodiment. Specifically, in the above case, the game system 1 resets the gaze point of the virtual camera 202 to the reference gaze position. This allows the initial position of the virtual camera 202 to be reliably set. In another embodiment, the game system 1 may repeat setting of search paths and search on the set search paths until a position satisfying the initial arrangement condition is found, without setting the upper limit value.

Also, in the case where the gaze point of the virtual camera 202 is set on a placement object, as in the case where the gaze point is set on a character, if a position to be searched for in the above search is outside the editing area, the game system 1 does not determine the position outside the editing area to be a position satisfying the initial arrangement condition.

Also, in the case where the gaze point of the virtual camera 202 is set on a placement object, as in the case where the gaze point is set on a character, a component, regarding the horizontal direction, of the initial position of the virtual camera 202 is determined by the above search. Meanwhile, a component, regarding the vertical direction (i.e., the height direction in the game space), of the initial position of the virtual camera 202 is set to a predetermined height.

Since the gaze point of the virtual camera 202 is set at the position of the placement object 205 as described above, the virtual camera 202 is set in an orientation in which the virtual camera 202 is directed from the initial position to the position of the placement object 205 (see FIG. 11). Furthermore, the game system 1 sets the angle of view of the virtual camera 202 to a predetermined angle of view (e.g., an angle of view at which the whole of the placement object 205 and the non-player character 204 is included in the field of view).

As described above, in the exemplary embodiment, the editing area may be a room in the virtual space. At this time, in the intermediate scene in which a placement object or a character is set at the gaze point of the virtual camera 202, the game system 1 sets the virtual camera 202 at a position where a placement object placed in the room (including both a placement object set at the gaze point and a placement object not set at the gaze point) is not placed. Thus, in the scene in which a target (i.e., the placement object or the character present at the position of the gaze point) is captured from a point of view inside the room, it is possible to reduce the possibility that the target is blocked by another placement object different from the target and is not appropriately displayed.

Moreover, in the exemplary embodiment, in the intermediate scene in which the gaze point of the virtual camera 202 is set on a placement object or a character, the game system 1 performs search along the search path that is set based on the direction of the target located at the position of the gaze point, and sets, as the initial position of the virtual camera 202, a position which has been found by the search and at which no placement object is placed (see FIGS. 12 and 13). In the exemplary embodiment, it can be said that a position, among the positions on the search path, which is closer to the search start position that is set based on the direction of the target located at the position of the gaze point, is more preferentially set as the initial position of the virtual camera 202. That is, in the exemplary embodiment, in the above intermediate scene, the game system 1 sets the position of the virtual camera, from among the positions where placement objects are not placed in the room, according to the priority based on the direction of the target. Thus, the virtual camera can be easily arranged at a position suitable for the direction of the target located at the position of the gaze point. For example, in the above intermediate scene, an image in which the target is viewed from the front side thereof is easily displayed.

In the exemplary embodiment, first, search is performed on a search path located within a predetermined distance range (specifically, a range of a distance equivalent to two squares) from the position of the target located at the gaze point, and if a position satisfying the initial arrangement condition has not been found on the search path, the search path is reset with the distance range from the position of the target being changed. Therefore, in the exemplary embodiment, it can be said that a position within the predetermined distance range from the position of the target is more preferentially set as the initial position of the virtual camera 202. That is, in the exemplary embodiment, in the intermediate scene in which the gaze point of the virtual camera 202 is set on a placement object or a character, the game system 1 sets the position of the virtual camera, according to the priority based on the position of the target located at the gaze point among the positions where placement objects are not placed in the room. This allows the virtual camera to be easily arranged at a distance suitable for capturing the target. For example, in the above intermediate scene, an image in which the target is viewed from an optimum distance is easily displayed.

In the exemplary embodiment, the initial arrangement condition regarding a certain position includes the condition that no placement object is placed between this position and the position of the gaze point. Thus, it is possible to reduce the possibility that, in the intermediate scene, the target is hidden by a placement object placed between the virtual camera 202 and the target located at the gaze point, and becomes invisible. Moreover, in the exemplary embodiment, since the search path is set around the target located at the gaze point (more specifically, so as to surround the target) (see FIGS. 12 and 13), positions in various directions with respect to the target can be the targets of the search. That is, the game system 1 sets the initial position of the virtual camera 202 with, as candidates of the initial position, a plurality of positions in different directions with respect to the target located at the gaze point. This allows a position where the target is not hidden by a placement object to be easily found by the search.

Figure 14:
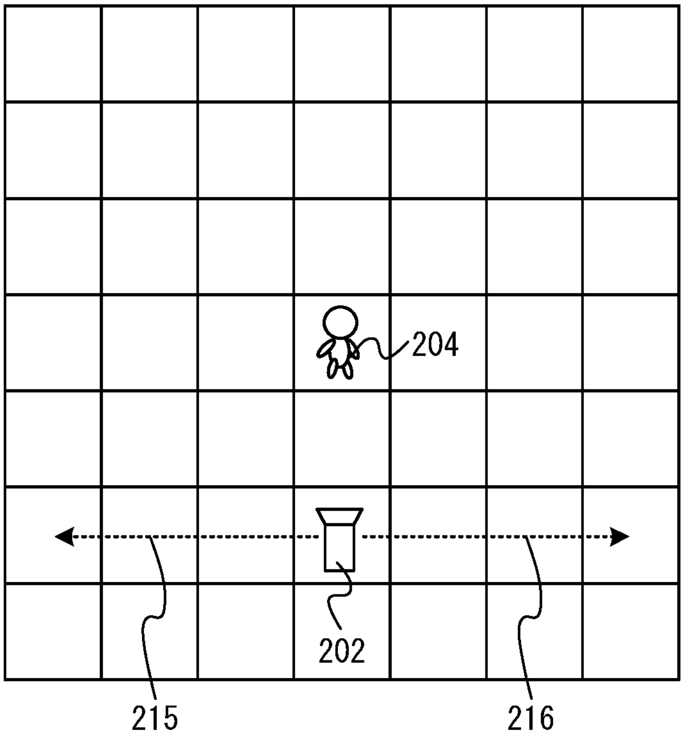
FIG. 14 shows an example of a method for determining an initial position of the virtual camera in a case where an editing area is a yard and the gaze point of the virtual camera is set on a character.
Figure 15:
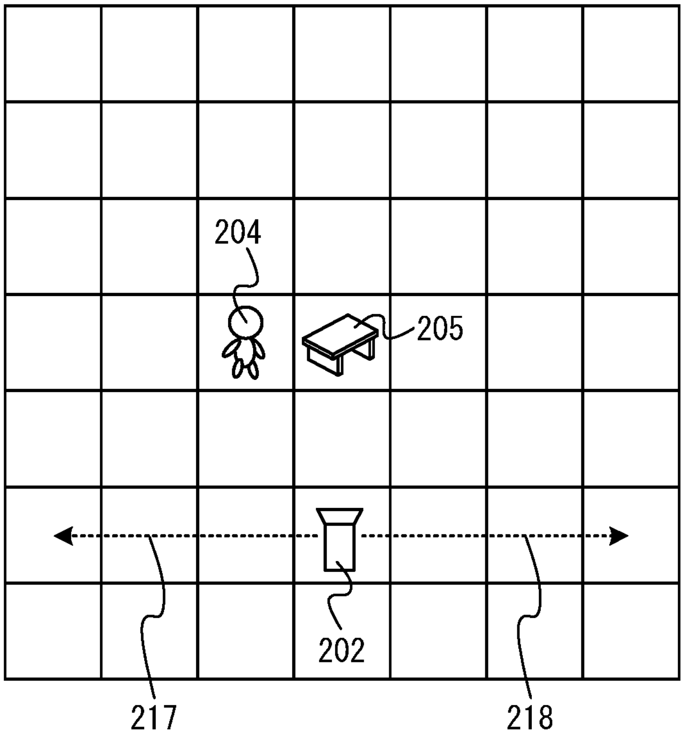
FIG. 15 shows an example of a method for determining an initial position of the virtual camera in a case where the editing area is a yard and the gaze point of the virtual camera is set on a placement object.

Meanwhile, in the case where the editing area is a yard, a search path, which is different from the search path set in the case where the gaze point of the virtual camera is set on a character or a placement object, is set. FIG. 14 shows an example of the method for determining the initial position of the virtual camera in the case where the editing area is a yard and the gaze point of the virtual camera is set on a character. FIG. 15 shows an example of the method for determining the initial position of the virtual camera in the case where the editing area is a yard and the gaze point of the virtual camera is set on a placement object.

As shown in FIG. 14, in the case where the editing area is a yard and the gaze point of the virtual camera 202 is set on the non-player character 204, search paths 215 and 216 are set so as to linearly extend to the left and right from the search start position (i.e., the left and right when the direction from the search start position to the non-player character 204 is the forward direction). The search paths 215 and 216 are set to have a predetermined length (e.g., a length equivalent to 2.5 squares).

Although the search paths differ between the case where the editing area is a yard and the case where the editing area is a room as described above, search in the case where the editing area is a yard is performed in the same process flow as that in the case where the editing area is a room. That is, the game system 1 performs the search for a position satisfying the initial arrangement condition, from the search start position along the search paths 215 and 216. Then, the game system 1 sets, as the initial position of the virtual camera 202, a position that satisfies the initial arrangement condition and has the smallest amount of shift from the search start position. If a position satisfying the initial arrangement condition has not been found on the search paths 215 and 216, the game system 1 newly sets search paths that are more apart from the non-player character 204 by a predetermined distance (e.g., 0.5 square) than the search paths 215 and 216. Then, the game system 1 performs the above search on the newly set search paths. If a position satisfying the initial arrangement condition has not yet been found, the game system 1 repeats setting of search paths and search on the set search paths until the distance from the non-player character 204 to the search paths reaches a predetermined upper limit value (e.g., a distance equivalent to 4.5 squares).

Meanwhile, when the editing area is a yard and the gaze point of the virtual camera is set on the placement object 205 as shown in FIG. 15, search paths 217 and 218 are set so as to linearly extend to the left and right from the search start position (i.e., the left and right when the direction from the search start position to the placement object 205 is the forward direction). The search paths 217 and 218 are set to have a predetermined length (e.g., a length equivalent to 2.5 squares).

Although the search path differs between the case where the editing area is a yard and the case where the editing area is a room as described above, search in the case where the editing area is a yard is performed in the same process flow as that in the case where the editing area is a room. That is, the game system 1 performs search on the search path 218 located in the forward direction of the non-player character 204, and thereafter performs search on the search path 217 located in the backward direction of the non-player character 204. If a position satisfying the initial arrangement condition has not been found on the search paths 217 and 218, the game system 1 newly sets search paths that are more apart from the placement object 205 by a predetermined distance (e.g., 0.5 square) than the search paths 217 and 218. If a position satisfying the initial arrangement condition has not yet been found, the game system 1 repeats setting of search paths and search on the set search paths until the distance from the placement object 205 to the search paths reaches a predetermined upper limit value (e.g., a distance equivalent to 4.5 squares).

In the case where the editing area is a yard and the gaze point is set at the reference gaze position, the initial position of the virtual camera 202 is set to be located on a predetermined side with respect to the reference gaze position. The "predetermined side" is the same as the side on which, when the gaze point is set on a character or a placement object, the search start position is set with respect to the character or the placement object. Therefore, in the exemplary embodiment, when the editing area is a yard, the virtual camera 202 is always arranged on the predetermined side with respect to the gaze point. In this case, one side of each of various objects arranged in the yard is not displayed in the presentation upon completion, a model of the object on the one side can be omitted, thereby reducing the amount of object data.

As described above, in the exemplary embodiment, the presentation upon completion includes a plurality of scenes (specifically, an intro-scene, intermediate scenes, and an outro-scene), and the game system 1 resets the gaze point of the virtual camera and resets the position of the virtual camera for each of a plurality of scenes (specifically, the intermediate scenes). Thus, the gaze point and the position of the virtual camera change for each intermediate scene, whereby the presentation upon completion can be performed with a wide variety of camera work.

More specifically, the game system 1 sets the gaze point of the virtual camera 202 on any of the position of a placement object placed in the editing area, a predetermined position in the editing area, and the position of a character arranged in the editing area, according to a predetermined order for each scene. Thus, various objects or positions in the editing area can be the targets to be captured by the virtual camera 202, thereby providing a wide variety of scenes.

[2-4. Setting of Virtual Camera Control Method in Intermediate Scene]

After the initial state of the virtual camera in the intermediate scene has been set, the game system 1 sets a method for controlling the virtual camera 202 in the intermediate scene. Specifically, the game system 1 sets a control method regarding control of movement and the angle of view of the virtual camera 202 during the intermediate scene.

In the exemplary embodiment, the game system 1 prepares in advance a plurality of types of control methods for the virtual camera 202. For example, the plurality of types of control methods include the following control methods.

(A) Control Method Regarding Change in the Up-Down Direction in the Game Space

Examples of the control method of the above (A) include: a control method of causing the virtual camera 202 to move in parallel in the up-down direction; a control method of causing the virtual camera 202 to rotate and move in the up-down direction (in other words, pitch direction) while changing the orientation so as to fix the gaze point; and a control method of changing the orientation regarding the pitch direction of the virtual camera 202.

(B) Control Method Regarding Change in the Horizontal Direction of the Game Space Examples of the control method of the above (B) include: a control method of causing the virtual camera 202 to move in parallel in the left-right direction or the front-back direction; and a control method of causing the virtual camera 202 to rotate and move in the horizontal direction while changing the orientation so as to fix the gaze point.

(C) Control Method Regarding Change in the Angle of View of the Virtual Camera 202

Examples of the control method of the above (C) include: a control method of reducing the angle of view (zoom-in); and a control method of increasing the angle of view (zoom-out).

In another embodiment, not all the control methods of the above (A) to (C) may be used, and some of the control methods may be used. In the another embodiment, as the aforementioned plurality of control methods, control methods obtained by combining some of the control methods of the above (A) to (C) may be prepared.

When the gaze point is the reference gaze position, the game system 1 selects one of the prepared control methods of the above (A) to (C) to set a control method for the virtual camera 202 in the intermediate scene. A specific method for selecting a control method is discretionary. For example, the game system 1 may select one of the above control methods at random. At this time, the game system 1 may select one of the control methods at random such that the control method already set for the intermediate scene in the current presentation upon completion is not (or less) likely to be selected again.

As described above, in the exemplary embodiment, in the intermediate scene (see FIG. 9) in which the gaze point of the virtual camera 202 is set at a predetermined position (i.e., the reference gaze position) in the room 201 and the position of the virtual camera 202 is set outside the room 201, the game system 1 controls the virtual camera 202, based on any of the plurality of methods including the method of causing the virtual camera 202 to move in parallel and the method of rotating and moving the virtual camera 2020 with the gaze point being fixed. Since the virtual camera 202 is arranged outside the room 201, the virtual camera 202 can be moved without interfering with the placement object in the room 201. Moreover, since the virtual camera 202 can be controlled in many variations, variations of intermediate scenes can be increased.

Meanwhile, when the gaze point is the position of a character or a placement object, the game system 1 selects one of the control methods of the above (A) or (C) to set a control method for the virtual camera 202 in the intermediate scene. In this case, a specific method for selecting a control method is also discretionary, and the game system 1 may select one of the control methods at random as in the case where the gaze point is the reference gaze position.

As described above, in the exemplary embodiment, in the intermediate scene in which the gaze point of the virtual camera 202 is set on a character or a placement object, the game system 1 controls the virtual camera 202, based on any of the plurality of control methods excluding the control method of changing the position of the virtual camera 202 in the vertical direction in the game space (i.e., based on the control methods included in the above (A) or (C)). Thus, it is possible to reduce the possibility that the virtual camera 202 moving in the intermediate scene interferes with the placement object in the editing area.

Also, in the case where the editing area is a yard, as in the case of a room, the game system 1 selects one of the plurality of prepared control methods to set a control method for the virtual camera 202 in the intermediate scene. That is, the game system 1 selects one of the control methods of the above (A) to (C) when the gaze point of the virtual camera 202 is the reference gaze position, and selects one of the control methods of the above (A) or (C) when the gaze point of the virtual camera 202 is on a character or a placement object, thereby setting the control method. However, in the case where the editing area is a yard and the gaze point is the reference gaze position, a position above the editing area (e.g., the position of the sky) or the like may be set as the reference gaze position, instead of the position at the center of the editing area. In the exemplary embodiment, in the case where the position above the editing area as a reference gaze position is set as the position of the gaze point, the game system 1 selects a control method from among control methods in which the yard is displayed after the virtual camera 202 has moved from the initial position (e.g., a control method of changing the line-of-sight direction of the virtual camera 202 downward, and a control method of zooming out the virtual camera 202). This is for avoiding the situation that the yard is not (or hardly) displayed in the intermediate scene, when the position above the editing area is set as the position of the gaze point.

As described above, in the exemplary embodiment, the game system 1, in the intermediate scene, changes at least one of the position, the orientation, and the angle of view of the virtual camera 202 from the position (initial position) of the virtual camera 202 having been set at the start of the intermediate scene. This allows the intermediate scene to be displayed by an active and effective presentation method.

In the exemplary embodiment, as described above, in each intermediate scene in the presentation upon completion, the initial state and the control method of the virtual camera 202 are set for each intermediate scene. That is, the game system 1 selects, for each intermediate scene, one of the plurality of control methods previously set for the virtual camera 202, and changes, based on the control method selected for each intermediate scene, at least one of the position, the orientation, and the angle of view of the virtual camera 202 during the intermediate scene. Thus, the manner of changing the virtual camera 202 can be varied for each intermediate scene, whereby variations of presentation upon completion can be increased, resulting in effective presentation.

As described above, in the exemplary embodiment, in selecting a control method, a selectable control method varies depending on which of a reference gaze position, a character, and a placement object is the target on which the gaze point is set. Thus, the virtual camera 202 can be controlled by the control method according to the type of the target on which the gaze point is set, whereby an image of an appropriate intermediate scene according to the type of the target can be easily generated.

In the exemplary embodiment, the above control method is selected at random. Therefore, the game system 1 can generate intermediate scenes of different contents each time presentation upon completion is performed, thereby realizing effective presentation that keeps the user from getting bored.

In the exemplary embodiment, the virtual camera 202 is set at a position outside the editing area when the gaze point is set at the reference gaze position, and the virtual camera 202 is set at a position within the editing area when the gaze point is set on a character or a placement object. In the former case, an image including the most part of the editing area (e.g., an image in which the editing area is looked down from above) is displayed. In the latter case, an image in which the target at the position of the gaze point is noticed is displayed. Therefore, in the exemplary embodiment, the presentation upon completion allows the user to confirm both the overall state of the editing area and the characters and objects arranged in the editing area.

[2-5. Motion Control for Character in Presentation Upon Completion]

In the presentation upon completion, the game system 1 controls the motion of the non-player character 204. That is, in each scene in the presentation upon completion, the non-player character 204 is controlled by the game system 1 to perform various motions. A specific method of motion control for the non-player character 204 is discretionary. In the exemplary embodiment, the motion of the non-player character 204 is controlled as follows.

In the case where the gaze point of the virtual camera 202 is set at the reference gaze position, the game system 1 selects, at random, a motion that the non-player character 204 performs, from among selection candidates of motions prepared in advance. The game system 1 may control the non-player character 204 such that the non-player character 204 performs a specific motion according to the reference gaze position at which the gaze point is set. For example, if the gaze point is set at the position of the bridge described above, the non-player character 204 may be controlled to perform a motion of walking across the bridge.

In the case where the gaze point of the virtual camera 202 is set on the non-player character 204, the game system 1 selects, at random, a motion that the non-player character 204 performs, from among selection candidates of motions prepared in advance. The selection candidates of motions in the case where the gaze point is set on the non-player character 204 may be the same as or different from the selection candidates in the case where the gaze point is set at the reference gaze position. The game system 1 may select (at random) a motion that the non-player character 204 performs, based on individuality set on the non-player character 204. For example, the game system 1 may select at random an operation that the non-player character 204 performs such that the non-player character 204 can easily perform a specific motion according to the individuality.

In the case where the gaze point of the virtual camera 202 is set on a placement object, the game system 1 controls the non-player character 204 such that the non-player character 204 performs a motion associated with the placement object. The motion associated with a placement object is a motion related to the placement object. For example, the motion associated with a placement object is a motion that the non-player character 204 performs to the placement object. More specifically, if the placement object is a chair, it is a motion of sitting on the chair. In another embodiment, for one placement object, a plurality of motions associated with the placement object may be prepared, and the game system 1 may select (at random, for example) one of selection candidates of the plurality of motions.

In each scene in the presentation upon completion, when the scene is switched to the next scene, the game system 1 moves the non-player character 204 according to need. For example, if the gaze point of the virtual camera 202 is set on the non-player character 204 or a placement object in the next scene, the non-player character 204 may be moved from the position in the previous scene so as to be arranged at the aforementioned position. Meanwhile, in the outro-scene, the non-player character 204 is arranged at a predetermined position. Therefore, in the intermediate scene just before the outro-scene, if the non-player character 204 is arranged at a position different from the predetermined position, the game system 1 moves the non-player character 204 to the predetermined position.

3. Specific Example of Processing in Game System

Next, a specific example of information processing in the game system 1 will be described with reference to FIGS. 16 to 19.

Figure 16:
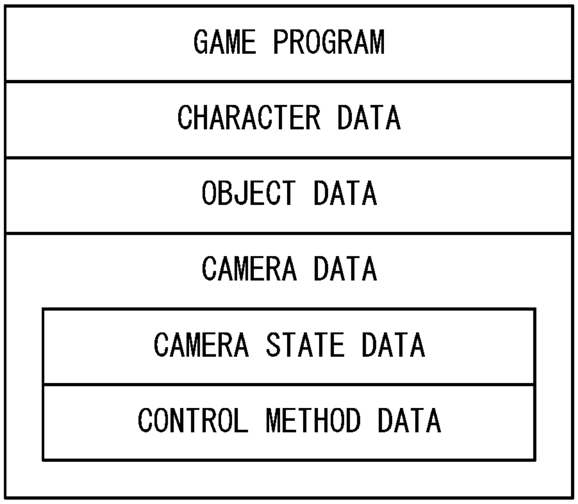
FIG. 16 shows an example of various types of data used for information processing in a non-limiting game system.

FIG. 16 shows an example of various types of data used for the information processing in the game system 1. The various types of data shown in FIG. 16 are stored in a storage medium (e.g., the flash memory 84, the DRAM 85, and/or the memory card attached to the slot 23) accessible by the main body apparatus 2.

As shown in FIG. 16, the game system 1 stores therein a game program. The game program is a program for executing the game processing (specifically, the processes shown in FIGS. 17 to 19) of the exemplary embodiment. The game system 1 further stores therein character data, object data, and camera data.

The character data indicates various types of information related to a character (e.g., the non-player character 204) arranged in the editing area. Specifically, the character data includes data indicating the position and direction of the character in the editing area. In addition to the above data, the character data may include, for example, data indicating a parameter that indicates ability and/or nature (including the above individuality) of the character. If a plurality of characters are arranged in the editing area, the character data includes, for each character, data indicating the various types of information.

The object data indicates various types of information related to an object (e.g., the above placement object) placed in the editing area. Specifically, the object data includes data indicating the position and direction of the object in the editing area. If a plurality of objects are arranged in the editing area, the object data includes, for each object, data indicating the various types of information.

The camera data indicates various types of information related to the virtual camera in the game space. Specifically, the camera data includes camera state data and control method data. The camera state data indicates various parameters indicating the state of the virtual camera (specifically, the gaze point, the position, the orientation, the angle of view, etc.). The control method data indicates a control method for the virtual camera in each scene in the presentation upon completion.

Figure 17:
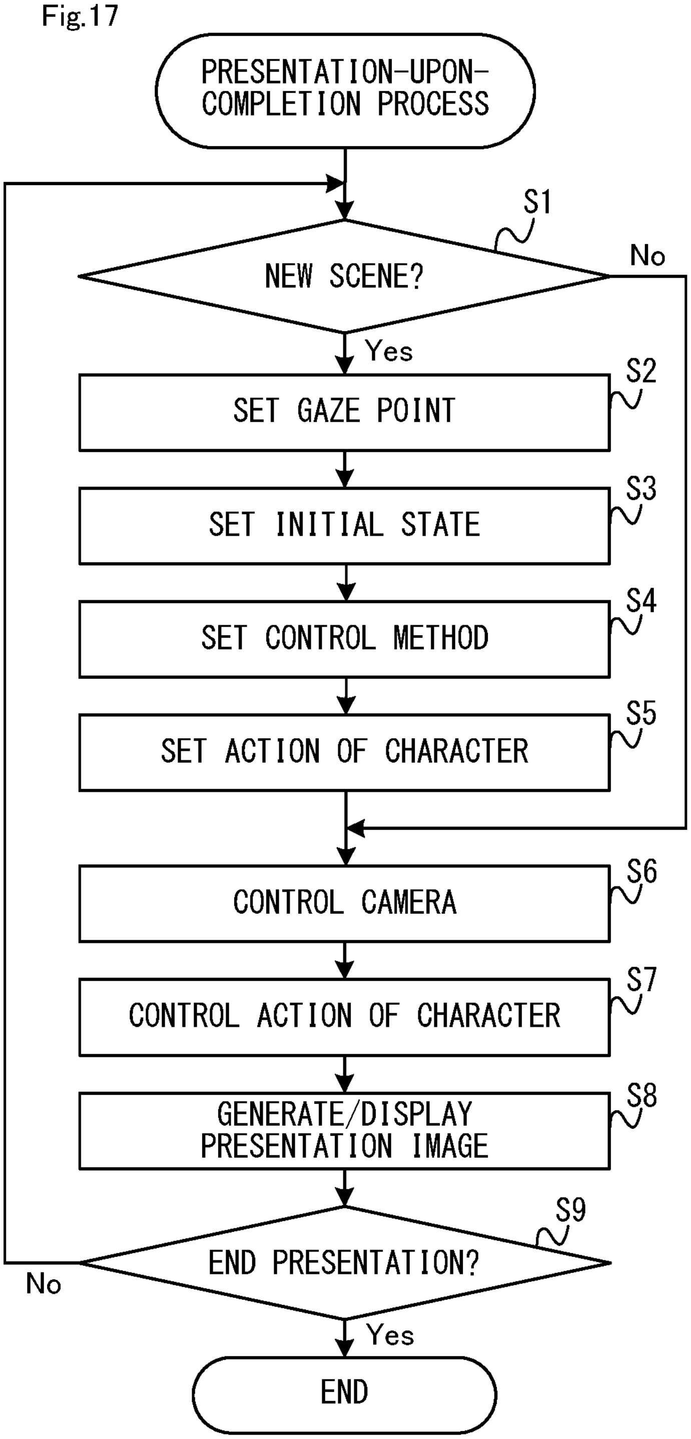
FIG. 17 is a flowchart showing an example of a flow of a presentation-upon-completion process executed by the non-limiting game system.

FIG. 17 is a flowchart showing a flow of a presentation-upon-completion process executed by the game system 1. For example, the presentation-upon-completion process shown in FIG. 17 is started when a timing to start presentation upon completion has arrived (e.g., when editing in the editing area has been completed) while the game program is being executed. In the exemplary embodiment, in the editing process executed before the presentation-upon-completion process, the processor 81 arranges objects in the editing area, based on an input of an editing operation performed by the user, and stores object data indicating arrangement of the objects, in the storage medium.

Figure 18:
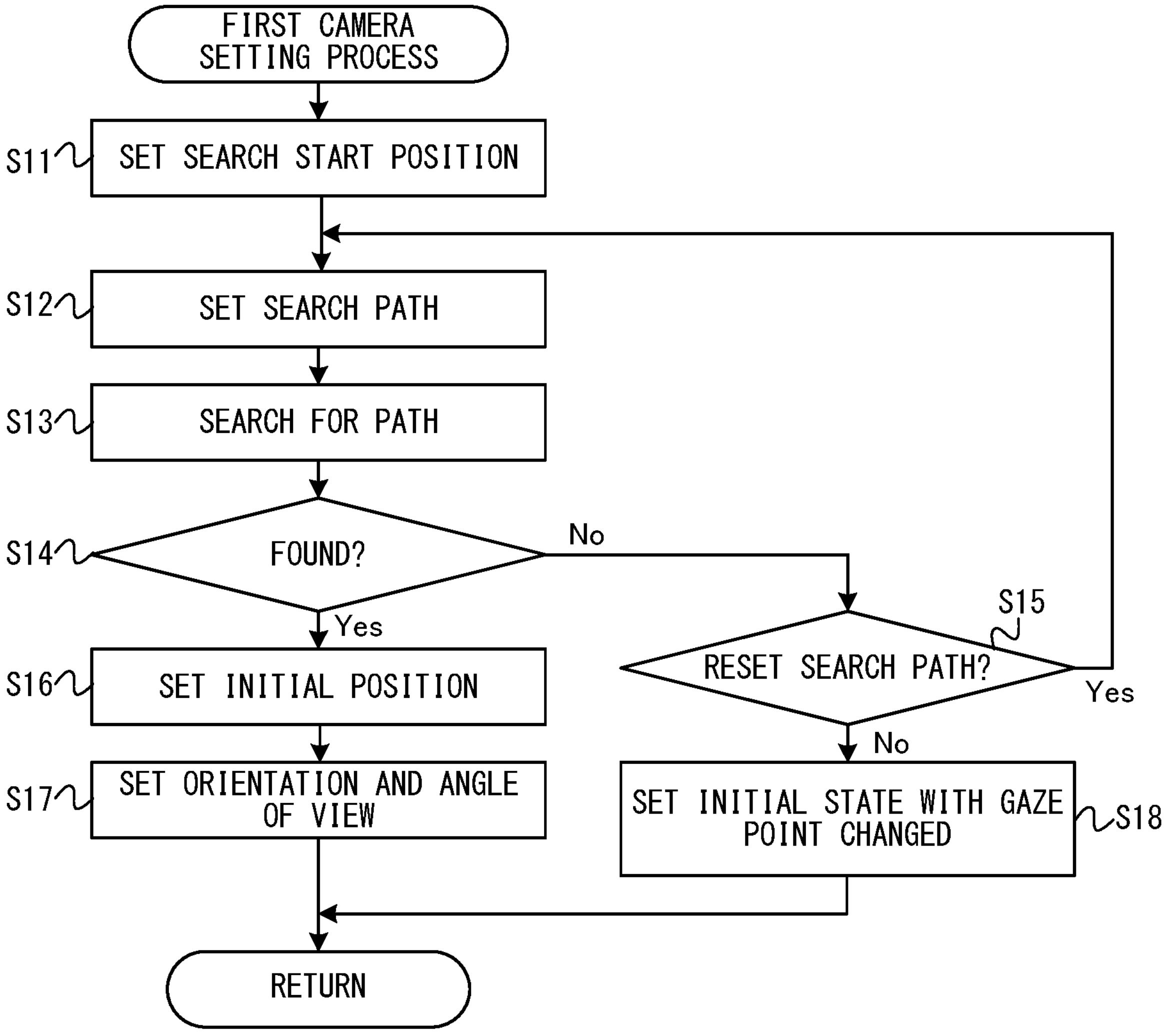
FIG. 18 is a sub-flowchart showing an example of a specific flow of a process in step S3 in a case where, in an intermediate scene, the gaze point of the virtual camera is set on a character.
Figure 19:
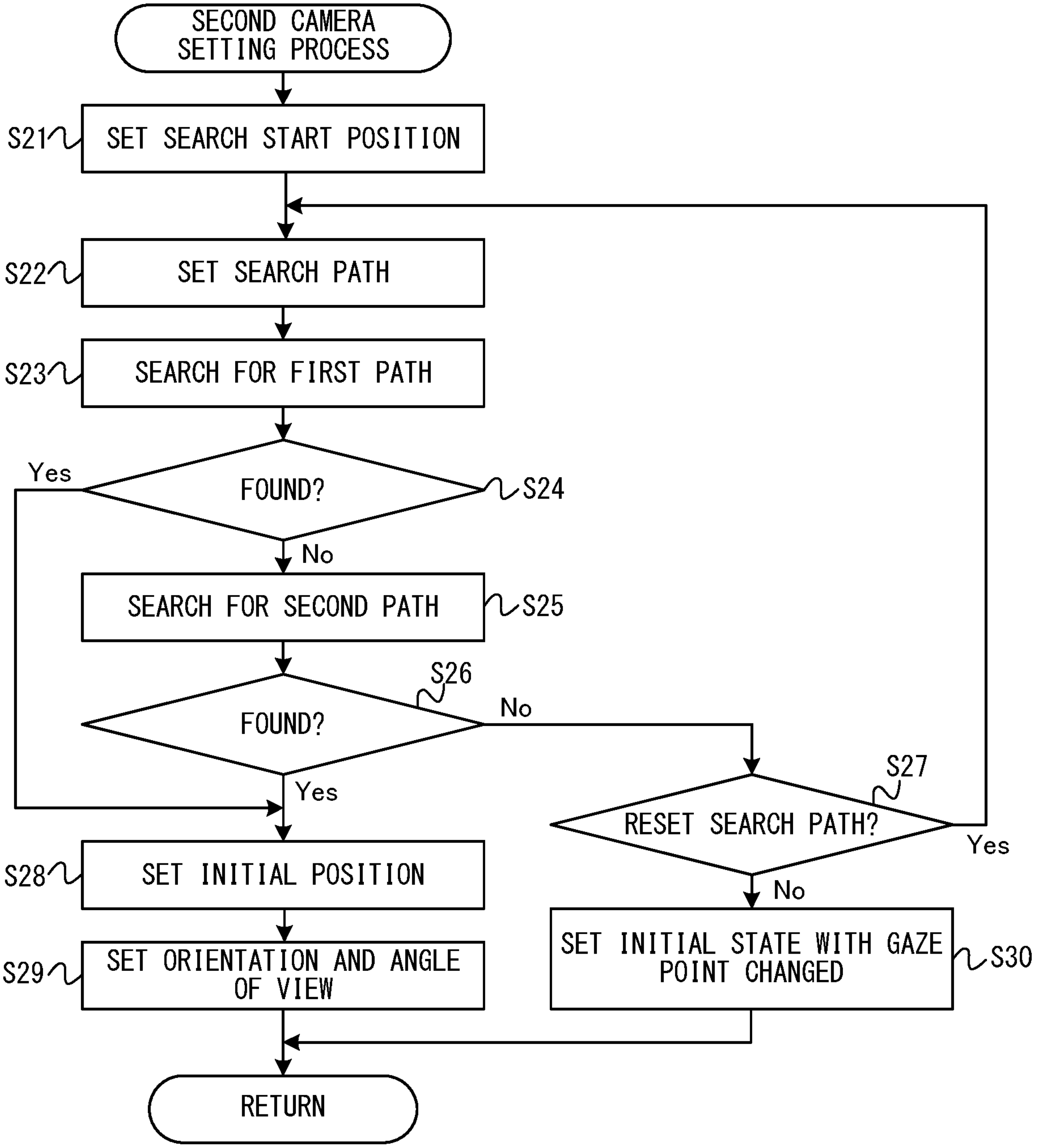
FIG. 19 is a sub-flowchart showing an example of a specific flow of a process in step S3 in a case where, in the intermediate scene, the gaze point of the virtual camera is set on a placement object.

In the exemplary embodiment, the processor 81 of the main body apparatus 2 executes the game program stored in the game system 1 to execute processes in steps shown in FIGS. 17 to 19. However, in another embodiment, a part of the processes in the steps may be executed by a processor (e.g., a dedicated circuit or the like) other than the above processor. If the game system 1 is communicable with another information processing apparatus (e.g., a server), a part of the processes in the steps shown in FIGS. 17 to 19 may be executed by another information processing apparatus (i.e., the game system 1 may include the other information processing apparatus). The processes in the steps shown in FIGS. 17 to 19 are merely examples, and the processing order of the steps may be changed or another process may be executed in addition to (or instead of) the processes in the steps as long as similar results can be obtained.

The processor 81 executes the processes in the steps shown in FIGS. 17 to 19 by using a memory (e.g., the DRAM 85). That is, the processor 81 stores information (in other words, data) obtained in each process step, in the memory, and reads out the information from the memory when using the information for the subsequent process steps.

In step S1 shown in FIG. 17, the processor 81 determines whether or not to start a new scene in presentation upon completion. In the exemplary embodiment, the processor 81 determines to start a new scene in the presentation upon completion, at a timing when an intro-scene is started after the presentation upon completion has been started, or at a timing when the previous scene has ended during the presentation upon completion. A timing to end each scene in the presentation upon completion is discretionary. For example, the processor 81 ends a scene when a predetermined time has elapsed from when the scene was started. When the determination result in step S1 is positive, the process in step S2 is executed. When the determination result in step S1 is negative, the processes in steps S2 to S5 are skipped and the process in step S6 is executed.

In step S2, the processor 81 sets the gaze point of the virtual camera in the new scene to be started. Specifically, when the new scene is an intro-scene or an outro-scene, the processor 81 sets the gaze point on a predetermined target (e.g., a position at the center of the editing area). When the new scene is an intermediate scene, the processor 81 sets the gaze point according to the method described in the above "[2-2. Setting of gaze point in intermediate scene]". The processor 81 updates the content of the camera state data in the camera data stored in the storage medium such that the camera state data indicates the set gaze point.

In step S3, the processor 81 sets the initial state (specifically, the initial position, the orientation, and the angle of view), other than the gaze point, of the virtual camera in the new scene to be started. Specifically, when the new scene is an intro-scene or an outro-scene, the processor 81 sets the initial state to a predetermined state. When the new scene is an intermediate scene, the processor 81 sets the initial state according to the method described in the above "[2-3. Setting of initial state of virtual camera in intermediate scene]". The process for setting the initial state of the virtual camera in the case where the gaze point of the virtual camera is set on a character or a placement object in the intermediate scene, will be described later in detail with reference to FIGS. 18 and 19. The processor 81 updates the content of the camera state data in the camera data stored in the storage medium such that the camera state data indicates the set initial state. Next to step S3, the process in step S4 is executed.

In step S4, the processor 81 sets a virtual camera control method in the new scene to be started. Specifically, when the new scene is an intro-scene or an outro-scene, the processor 81 sets a predetermined control method. When the new scene is an intermediate scene, the processor 81 sets a control method according to the method described in the above "[2-4. Setting of virtual camera control method in intermediate scene]". The processor 81 updates the content of the control method data in the camera data stored in the storage medium such that the control method data indicates the set control method. Next to step S4, the process in step S5 is executed.

In step S5, the processor 81 sets a motion of a character (i.e., the non-player character 204) in the new scene to be started. Specifically, when the new scene is an intro-scene or an outro-scene, the processor 81 sets a predetermined motion as a motion to be performed by the character. When the new scene is an intermediate scene, the processor 81 sets a motion of the character according to the above "[2-5. Motion control for character in presentation upon completion]". Next to step S5, the process in step S6 is executed.

As described above, in the exemplary embodiment, each time a new scene is started in the presentation-upon-completion process, the processor 81 performs setting regarding the virtual camera and the character in the scene. However, in another embodiment, the processor 81 may perform settings regarding the virtual camera and the characters in the respective intermediate scenes included in the presentation upon completion, all at once, when the presentation-upon-completion process is started.

In step S6, the processor 81 controls the virtual camera according to the control method set in step S4. That is, the processor 81 changes the state of the virtual camera, according to the content of the control method data in the camera data stored in the storage medium. In the presentation-upon-completion process shown in FIG. 17, a processing loop of steps S1 to S9 is executed once every predetermined time period (i.e., one-frame time). Therefore, in a single process in step S6, the processor 81 changes the state of the virtual camera by an amount of change equivalent to one-frame time. Next to step S6, the process in step S7 is executed.

In step S7, the processor 81 controls the character according to the content of the motion set in step S5. In a single process in step S7, the processor 81 causes the character to move by an amount of motion equivalent to one-frame time. Next to step S7, the process in step S8 is executed.

In step S8, the processor 81 generates a presentation image (in other words, a game image) in the presentation upon completion, and causes the display 12 to display the presentation image. That is, the processor 81 generates an image indicating the editing area (i.e., an image of the editing area as viewed from the virtual camera) by using the virtual camera controlled in step S6. In the exemplary embodiment, the game system 1 displays the image on the display 12. However, the image may be displayed on another display device (e.g., a monitor connected to the main body apparatus 2) different from the display 12. Next to step S8, the process in step S9 is executed.

In step S9, the processor 81 determines whether or not to end the presentation upon completion. Specifically, the processor 81 determines whether or not a timing to end the outro-scene has arrived. When the determination result in step S9 is negative, the process in step S1 is executed again. Thereafter, the processing loop of steps S1 to S9 is repeatedly executed until it is determined in step S9 to end the presentation upon completion. When the determination result in step S9 is positive, the processor 81 ends the presentation-upon-completion process shown in FIG. 17.

FIG. 18 is a sub-flowchart showing an example of a specific flow of the process in step S3 (the process of setting the initial state of the virtual camera, referred to as a first camera setting process in FIG. 18) in the case where the gaze point of the virtual camera is set on a character in an intermediate scene.

In step S11, the processor 81 sets a search start position in search for setting an initial position of the virtual camera. As described in the above "[2-3. Setting of initial state of virtual camera in intermediate scene]", the search start position is determined based on the position and direction of the character arranged at the position of the gaze point (see FIGS. 12 and 14). The processor 81 specifies the position and direction of the character by referring to the character data stored in the storage medium. Next to step S11, the process in step S12 is executed.

In step S12, the processor 81 sets search paths in search for setting the initial position of the virtual camera. As described in the above "[2-3. Setting of initial state of virtual camera in intermediate scene]", the processor 81 sets two search paths, based on the position of the character arranged at the position of the gaze point and on the search start position (see FIGS. 12 and 14). Next to step S12, the process in step S13 is executed.

In step S13, the processor 81 searches each of the two search paths set in step S12 for a position satisfying the initial arrangement condition. In the first camera setting process shown in FIG. 18, the processor 81 may perform the search on each of the two search paths from the search start position, and when a position satisfying the initial arrangement condition has been found, the processor 81 may end the search on the search path where the position has been found. Next to step S13, the process in step S14 is executed.

In step S14, the processor 81 determines whether or not a position satisfying the initial arrangement condition has been found in the search process in step S13. When the determination result in step S14 is negative, the process in step S15 is executed. When the determination result in step S14 is positive, the process in step S16 is executed.

In step S15, the processor 81 determines whether or not to reset the search paths. This determination depends on whether or not the distance from the character arranged at the position of the gaze point to the search path most recently set in step S13 has reached the aforementioned upper limit value. When the distance has reached the upper limit value, the processor 81 determines not to reset the search paths. When the distance has not yet reached the upper limit value, the processor 81 determines to reset the search paths. When the determination result in step S15 is positive, the process in step S12 is executed again. Thus, the search paths are set again (step S12), and search is performed again on the set search paths (step S13). When the determination result in step S15 is negative (that is, when a position satisfying the initial arrangement condition has not been found through the search), the process in step S18 described later is executed.

In step S16, the processor 81 sets the position found through the search in step S13, as an initial position of the virtual camera 202. As described in the above "[2-3. Setting of initial state of virtual camera in intermediate scene]", if a position satisfying the initial arrangement condition has been found on each of the two search paths, one of the two positions is set as the initial position of the virtual camera 202 according to the method described in the above "[2-3. Setting of initial state of virtual camera in intermediate scene]". Next to step S16, the process in step S17 is executed.

In step S17, the processor 81 sets an initial orientation and an initial angle of view of the virtual camera. The initial orientation and the initial angle of view are set according to the method described in the above "[2-3. Setting of initial state of virtual camera in intermediate scene]". After step S17, the processor 81 ends the first camera setting process shown in FIG. 18.

Meanwhile, in step S18, the processor 81 changes the gaze point of the virtual camera, and sets the initial state of the virtual camera based on the changed gaze point. Specifically, as described in the above "[2-3. Setting of initial state of virtual camera in intermediate scene]", the processor 81 resets the gaze point of the virtual camera to the reference gaze position, and sets the initial state of the virtual camera, based on the gaze point set at the reference gaze position. After step S18, the processor 81 ends the first camera setting process shown in FIG. 18.

FIG. 19 is a sub-flowchart showing an example of a specific flow of the process in step S3 (the process of setting the initial state of the virtual camera, referred to as a first camera setting process in FIG. 19) in the case where the gaze point of the virtual camera is set on a placement object in an intermediate scene.

In step S21, the processor 81 sets a search start position in search for setting an initial position of the virtual camera. As described in the above "[2-3. Setting of initial state of virtual camera in intermediate scene]", the search start position is determined based on the position and direction of the placement object arranged at the position of the gaze point (see FIGS. 13 and 15). The processor 81 specifies the position and direction of the placement object by referring to the object data stored in the storage medium. Next to step S21, the process in step S22 is executed.

In step S22, the processor 81 sets search paths in search for setting the initial position of the virtual camera. As described in the above "[2-3. Setting of initial state of virtual camera in intermediate scene]", the processor 81 sets two search path, based on the positions of the placement object and the non-player character arranged at the position of the gaze point, and on the search start position (see FIGS. 13 and 15). Next to step S22, the process in step S23 is executed.

In step S23, the processor 81 searches a first search path, of the search paths set in step S22, for a position satisfying the initial arrangement condition. The "first search path" is a search path located in the forward direction of the non-player character (the search path 214 shown in FIG. 13 or the search path 218 shown in FIG. 15). Thus, in a second camera setting process shown in FIG. 19, the processor 81 performs the search on the first search path of the two search paths from the search start position, and ends the search when a position satisfying the initial arrangement condition has been found. Next to step S23, the process in step S24 is executed.

In step S24, the processor 81 determines whether or not a position satisfying the initial arrangement condition has been found in the search in step S23. When the determination result in step S24 is negative, the process in step S25 is executed. When the determination result in step S24 is positive, the process in step S28 is executed.

In step S25, the processor 81 searches a second search path, of the search paths set in step S22, for a position satisfying the initial arrangement condition. The "second search path" is a search path located in the backward direction of the non-player character (the search path 213 shown in FIG. 13 or the search path 217 shown in FIG. 15). Thus, in the second camera setting process shown in FIG. 19, the processor 81 performs the search on the first search path of the two search paths from the search start position, and when a position satisfying the initial arrangement condition has been found, the processor 81 performs the search on the second search path. Next to step S25, the process in step S26 is executed.

In step S26, the processor 81 determines whether or not a position satisfying the initial arrangement condition has been found in the search in step S25. When the determination result in step S26 is negative, the process in step S27 is executed. When the determination result in step S26 is positive, the process in step S28 described later is executed.

In step S27, the processor 81 determines whether or not to reset the search paths. This determination depends on whether or not the distance from the placement object arranged at the position of the gaze point to the search path most recently set in step S23 has reached the aforementioned upper limit value. When the distance has reached the upper limit value, the processor 81 determines not to reset the search paths. When the distance has not yet reached the upper limit value, the processor 81 determines to reset the search paths. When the determination result in step S27 is positive, the process in step S22 is executed again. Thus, the search paths are set again (step S22), and search is performed again on the set search paths (steps S23, S25). When the determination result in step S27 is negative (that is, when a position satisfying the initial arrangement condition has not been found through the search), the process in step S30 described later is executed.

In step S28, the processor 81 sets, as the initial position of the virtual camera 202, the position found through the search in step S23 or S25. Next to step S28, the process in step S29 is executed.

In step S29, the processor 81 sets an initial orientation and an initial angle of view of the virtual camera. The initial orientation and the initial angle of view are set according to the method described in the above "[2-3. Setting of initial state of virtual camera in intermediate scene]". After step S29, the processor 81 ends the second camera setting process shown in FIG. 19.

Meanwhile, in step S30, the processor 81 changes the gaze point of the virtual camera, and sets the initial state of the virtual camera, based on the changed gaze point. The process in step S30 is identical to the process in step S18. After step S30, the processor 81 ends the second camera setting process shown in FIG. 19.

4. Function and Effect of the Present Embodiment, and Modifications

As described above, in the exemplary embodiment, the game program is configured to cause a processor of an information processing apparatus (e.g., the main body apparatus 2) to execute the following processes.

- Performing, in a predetermined area (specifically, an editing area) in a virtual space, editing including at least one of selecting a placement object to be placed in the area, placing the placement object, and moving the placement object, on the basis of an operation input.
- Performing presentation upon completion according to a completion instruction based on an operation input or according to a predetermined completion condition being satisfied, the presentation including at least one scene, the presentation displaying, for each scene, an image of the area based on a virtual camera (FIG. 17).
- In the scene (specifically, an intermediate scene), setting a gaze point of the virtual camera at any of: a position of a placement object placed in the area, a predetermined position (specifically a reference gaze position) in the area, and a position of a character arranged in the area (step S2).
- In the scene (specifically, an intermediate scene), setting the virtual camera at a position at which the placement object placed in the area is not placed (step S3).

According to the above configuration, since the virtual camera is set at the position at which the placement object placed in the area is not placed, it is possible to effectively perform the presentation upon completion by using the image generated based on the virtual camera. For example, in each scene in the presentation upon completion, it is possible to reduce the possibility of inconvenience that a target (the aforementioned character, placement object, or predetermined position) arranged at the position of the gaze point is hidden by the placement object.

In the above embodiment, the presentation upon completion is performed when editing to the editing area has been completed. The "completion of editing" does not mean that it is no longer possible to perform further editing to the editing area. That is, in the exemplary embodiment, further editing can be performed to the editing area which has been edited and subjected to presentation upon completion. In this case, the game system 1 may further perform presentation upon completion after the further editing has been completed.

The genre of the game executed in the exemplary embodiment is discretionary. The presentation upon completion according to the exemplary embodiment can be used in any genre of game, as any presentation in which the content of editing performed to a predetermined area by the user is presented to the user.

In another embodiment, the information processing system may not include some of the components in the above embodiment, and may not execute some of the processes executed in the above embodiment. For example, in order to achieve a specific effect of a part of the above embodiment, the information processing system only needs to include a configuration for achieving the effect and execute a process for achieving the effect, and need not include other configurations and need not execute other processes.

The exemplary embodiment can be used as, for example, a game program, a game system, and the like, in order to, for example, effectively perform presentation for showing arrangement of objects to the user.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer-readable storage medium having stored therein a game program that, when executed by a processor of an information processing apparatus, causes the processor to perform operations comprising:

performing, in a predetermined area in a virtual space, editing including at least one of selecting a placement object to be placed in the area, placing the placement object, and moving the placement object, based on an operation input, wherein the area is a room in the virtual space;

performing presentation upon completion according to a completion instruction based on an operation input or according to a predetermined completion condition being satisfied, the presentation including at least one scene, the presentation displaying, for each scene, an image of the area based on a virtual camera; and in the scene:

setting a gaze point of the virtual camera at any of a position of the placement object placed in the area, a predetermined position in the area, and a position of a character arranged in the area, wherein based on setting the gaze point to the position of the placement object or the position of the character arranged in the area, a position of the virtual camera is set at a position at which the placement object placed in the room is not placed and the position of the virtual camera is set to a position among positions, in the room, at which the placement object is not placed, based on a priority that is set based on a direction of the placement object or the character arranged at the gaze point, and setting the virtual camera at a position at which the placement object placed in the area is not placed.

2. The non-transitory computer-readable storage medium according to claim 1, wherein the presentation upon completion includes a plurality of scenes, and the operations further comprise, for each of the plurality of scenes, resetting the gaze point of the virtual camera, and resetting the position of the virtual camera.

3. The non-transitory computer-readable storage medium according to claim 2, wherein the operations further comprise:

setting the gaze point of the virtual camera, according to an order set in advance for each scene, from any of the position of the placement object placed in the area, the predetermined position in the area, and the position of the character arranged in the area.

4. The non-transitory computer readable storage medium according to claim 1, wherein the operations further comprise:

changing, in the scene, at least one of a position, an orientation, and an angle of view of the virtual camera, from a state, of the virtual camera, that is set at start of the scene.

5. The non-transitory computer-readable storage medium according to claim 4, wherein the operations further comprise:

selecting, for each scene, one of a plurality of control methods that are set in advance regarding the virtual camera; and controlling, based on the control method selected for each scene, at least one of the position, the orientation, and the angle of view of the virtual camera in the scene.

6. The non-transitory computer-readable storage medium according to claim 5, wherein the control method selectable in the selecting varies depending on which of the position of the placement object, the predetermined position in the area, and the position of the character is the position of the gaze point.

7. The non-transitory computer-readable storage medium according to claim 5, wherein the control method is selected at random.

8. The non-transitory computer-readable storage medium according to claim 1, wherein the area is a room in the virtual space, and the predetermined position in the area is a position in the room.

9. The non-transitory computer-readable storage medium according to claim 8, wherein in the scene in which the gaze point is set at the predetermined position in the room, the position of the virtual camera is set outside the room.

10. The non-transitory computer-readable storage medium according to claim 9, wherein in the scene in which the gaze point is set at the predetermined position in the room and the position of the virtual camera is set outside the room, the virtual camera is controlled based on any of a plurality of control methods including a method of moving the virtual camera in parallel, and a method of rotating and moving the virtual camera with the gaze point being fixed.

11. The non-transitory computer-readable storage medium according to claim 1, wherein in the scene in which the gaze point is set on the placement object or the character, the virtual camera is controlled based on any of a plurality of control methods excluding a control method of changing the position of the virtual camera in a horizontal direction in the virtual space.

12. The non-transitory computer-readable storage medium according to claim 1, wherein the character is a non-player character that is arranged in the area according to the completion instruction or according the completion condition being satisfied.

13. The non-transitory computer-readable storage medium according to claim 1, wherein the area is an area that is set outdoors in the virtual space, and the predetermined position in the area is a position of sky, a predetermined geographical feature, or a predetermined building in the virtual space.

14. An information processing system comprising:

a processor and a storage medium having stored therein a game program, wherein the processor is configured to execute the game program to at least:

perform, in a predetermined area in a virtual space, editing including at least one of selecting a placement object to be placed in the area, placing the placement object, and moving the placement object, based on an operation input, wherein the area is a room in the virtual space;

perform presentation upon completion according to a completion instruction based on an operation input or according to a predetermined completion condition being satisfied, the presentation including at least one scene, the presentation displaying, for each scene, an image of the area based on a virtual camera; and in the scene;

set a gaze point of the virtual camera at any of a position of the placement object placed in the area, a predetermined position in the area, and a position of a character arranged in the area, wherein based on setting the gaze point to the position of the placement object or the position of the character arranged in the area, a position of the virtual camera is set at a position at which the placement object placed in the room is not placed and the position of the virtual camera is set to a position among positions, in the room, at which the placement object is not placed, based on a priority that is set based on a direction of the placement object or the character arranged at the gaze point, and set the virtual camera at a position at which the placement object placed in the area is not placed.

15. The information processing system according to claim 14, wherein the presentation upon completion includes a plurality of scenes, and the processor, for each of the plurality of scenes, is further configured to:

reset the gaze point of the virtual camera, and reset the position of the virtual camera.

16. The information processing system according to claim 15, wherein the processor is further configured to set the gaze point of the virtual camera, according to an order set in advance for each scene, from any of the position of the placement object placed in the area, the predetermined position in the area, and the position of the character arranged in the area.

17. The information processing system according to claim 14, wherein the processor is further configured to change, in the scene, at least one of a position, an orientation, and an angle of view of the virtual camera, from a state, of the virtual camera, that is set at start of the scene.

18. The information processing system according to claim 17, wherein the processor is further configured to select, for each scene, one of a plurality of control methods that are set in advance regarding the virtual camera, and control, based on the control method selected for each scene, at least one of the position, the orientation, and the angle of view of the virtual camera in the scene.

19. The information processing system according to claim 18, wherein the control method selectable in the selecting varies depending on which of the position of the placement object, the predetermined position in the area, and the position of the character is the position of the gaze point.

20. The information processing system according to claim 18, wherein the control method is selected at random.

21. The information processing system according to claim 14, wherein the area is a room in the virtual space, and the predetermined position in the area is a position in the room.

22. The information processing system according to claim 21, wherein in the scene in which the gaze point is set at the predetermined position in the room, the processor is further configured to set the position of the virtual camera outside the room.

23. The information processing system according to claim 22, wherein in the scene in which the gaze point is set at the predetermined position in the room and the position of the virtual camera is set outside the room, the processor is further configured to control the virtual camera, based on any of a plurality of control methods including a method of moving the virtual camera in parallel, and a method of rotating and moving the virtual camera with the gaze point being fixed.

24. The information processing system according to claim 14, wherein in the scene in which the gaze point is set on the placement object or the character, the processor is further configured to control the virtual camera, based on any of a plurality of control methods excluding a control method of changing the position of the virtual camera in a horizontal direction in the virtual space.

25. The information processing system according to claim 14, wherein the character is a non-player character that is arranged in the area according to the completion instruction or according the completion condition being satisfied.

26. The information processing system according to claim 14, wherein the area is an area that is set outdoors in the virtual space, and the predetermined position in the area is a position of sky, a predetermined geographical feature, or a predetermined building in the virtual space.

27. An information processing apparatus comprising:

a processor that is coupled to memory, the processor being configured to perform operations comprising:

performing, in a predetermined area in a virtual space, editing including at least one of selecting a placement object to be placed in the area, placing the placement object, and moving the placement object, based on an operation input, wherein the area is a room in the virtual space;

performing presentation upon completion according to a completion instruction based on an operation input or according to a predetermined completion condition being satisfied, the presentation including at least one scene, the presentation displaying, for each scene, an image of the area based on a virtual camera; and in the scene:

setting a gaze point of the virtual camera at any of a position of the placement object placed in the area, a predetermined position in the area, and a position of a character arranged in the area, wherein based on setting the gaze point to the position of the placement object or the position of the character arranged in the area, a position of the virtual camera is set at a position at which the placement object placed in the room is not placed and the position of the virtual camera is set to a position among positions, in the room, at which the placement object is not placed, based on a priority that is set based on a direction of the placement object or the character arranged at the gaze point, and setting the virtual camera at a position at which the placement object placed in the area is not placed.

28. The information processing apparatus according to claim 27, wherein the presentation upon completion includes a plurality of scenes, and the operations further comprise:

resetting the gaze point of the virtual camera, and resetting the position of the virtual camera.

29. The information processing apparatus according to claim 27, wherein the operations further comprise changing, in the scene, at least one of a position, an orientation, and an angle of view of the virtual camera, from a state, of the virtual camera, that is set at start of the scene.

30. The information processing apparatus according to claim 29, wherein the operations further comprise:

selecting, for each scene, one of a plurality of control methods that are set in advance regarding the virtual camera, and controlling, based on the control method selected for each scene, at least one of the position, the orientation, and the angle of view of the virtual camera in the scene.

31. A game processing method executed by an information processing system, the game processing method comprising:

performing, in a predetermined area in a virtual space, editing including at least one of selecting a placement object to be placed in the area, placing the placement object, and moving the placement object, based on an operation input, wherein the area is a room in the virtual space;

performing presentation upon completion according to a completion instruction based on an operation input or according to a predetermined completion condition being satisfied, the presentation including at least one scene, the presentation displaying, for each scene, an image of the area based on a virtual camera; and in the scene:

setting a gaze point of the virtual camera at any of a position of the placement object placed in the area, a predetermined position in the area, and a position of a character arranged in the area, wherein based on setting the gaze point to the position of the placement object or the position of the character arranged in the area, a position of the virtual camera is set at a position at which the placement object placed in the room is not placed and the position of the virtual camera is set to a position among positions, in the room, at which the placement object is not placed, based on a priority that is set based on a direction of the placement object or the character arranged at the gaze point, and setting the virtual camera at a position at which the placement object placed in the area is not placed.

32. The game processing method according to claim 31, wherein the presentation upon completion includes a plurality of scenes, and the method further comprises:

for each of the plurality of scenes, resetting the gaze point of the virtual camera, and resetting the position of the virtual camera.

33. The game processing method according to claim 31, further comprising changing, in the scene, at least one of a position, an orientation, and an angle of view of the virtual camera, from a state, of the virtual camera, that is set at start of the scene.

34. The game processing method according to claim 33, further comprising:

selecting, for each scene, one of a plurality of control methods that are set in advance regarding the virtual camera, and controlling, based on the control method selected for each scene, at least one of the position, the orientation, and the angle of view of the virtual camera in the scene.

* * * * *